United States Patent [19]

Tsutsumi et al.

[11] Patent Number: 5,394,848
[45] Date of Patent: Mar. 7, 1995

[54] AIR-INTAKE CONTROL SYSTEM FOR INTERNAL COMBUSTION ENGINE

[75] Inventors: Yasuhito Tsutsumi, Susono; Ken Tanoue, Numazu; Makoto Suzuki, Mishima; Takeshi Gouno, Suntou, all of Japan

[73] Assignee: Toyota Jidosha Kabushiki Kaisha, Toyota, Japan

[21] Appl. No.: 53,118

[22] Filed: Apr. 26, 1993

[30] Foreign Application Priority Data

| Apr. 28, 1992 | [JP] | Japan | 4-110512 |
| May 29, 1992 | [JP] | Japan | 4-139085 |
| May 29, 1992 | [JP] | Japan | 4-139086 |
| Aug. 5, 1992 | [JP] | Japan | 4-209301 |

[51] Int. Cl.⁶ .................. F02B 39/10
[52] U.S. Cl. .................. 123/399; 123/361; 60/397; 290/51
[58] Field of Search .......... 123/399, 361; 60/397; 290/1 R, 51, 52, 40 C

[56] References Cited

U.S. PATENT DOCUMENTS

| 3,180,079 | 4/1965 | Freeman | 60/397 |
| 3,958,419 | 5/1976 | Laing | 60/397 |
| 4,459,490 | 7/1984 | Brandon | 290/51 |
| 4,745,754 | 5/1988 | Kawamura | 290/52 |
| 4,757,686 | 7/1988 | Kawamura et al. | 290/52 |
| 4,827,170 | 5/1989 | Kawamura et al. | 290/52 |

FOREIGN PATENT DOCUMENTS

| 62-141637 | 9/1987 | Japan . | |
| 2-291426 | 12/1990 | Japan . | |
| 4-54221 | 2/1992 | Japan . | |
| 92/09800 | 6/1992 | WIPO | 60/397 |

*Primary Examiner*—David A. Okonsky
*Attorney, Agent, or Firm*—Kenyon & Kenyon

[57] ABSTRACT

A turbine, which is an essential portion of an air motor, is disposed midway along an air-intake passage communicating to combustion chambers of an engine. A generator is operably connected to an output shaft of the turbine. The generator has a function to control the rotational motion of the turbine in proportion to the magnitude of the generated electric energy, in addition to the original function of generating the electric energy. The generator is electrically connected to an air-intake control device. In other words, the air-intake control device includes a transistor, and potentiometer which includes a resistor and a sliding element. A positive electrode of generator is connected to an emitter of the transistor. Further, a base of the transistor is connected to an output terminal of the potentiometer, and a collector thereof to a battery. When the operation magnitude of an acceleration pedal is small, the current flowing through the base decreases. Therefore, the generator generates more electric energy. Along this condition, the generator regulates the rotation of the turbine in higher degrees. Consequently, the turbine becomes less rotatable. As a result, as it becomes difficult for the intake air to flow through the turbine, the flow volume of intake air to be introduced into the combustion chambers decreases.

20 Claims, 13 Drawing Sheets

AIR-INTAKE CONTROL SYSTEM FOR INTERNAL COMBUSTION ENGINE

BACKGROUND OF THE INVENTION

1. Field of the Invention

The present invention relates generally to an air-intake control system for a vehicular engine. More particularly, this invention pertains to an air-intake control system, which converts part of the flowing energy retained within the intake air into electric energy, and recovers this converted energy.

2. Description of the Related Art

A known air-intake system is disclosed in Japanese Unexamined Patent Publication No. 2-291426. This system is primarily designed for the purpose of reducing the pumping loss and improving the gas milage.

As shown in FIG. 18, the described system includes an engine 301 having a plurality of combustion chambers 302 (only one chamber is shown), which is communicated to a primary air-intake passage 303. A turbine (air motor) 304, which is rotated by the flow of intake air, is disposed midway along the passage 303. The turbine 304 is connected with a crank shaft 306, via a belt 305. The primary passage 303 has a secondary air-intake passage 307 for communicating the upper stream side with the downstream side with regard to the turbine 304. A first throttle valve 308 is provided within the primary passage 303. A second throttle valve 309 is provided within the secondary passage 306. Both throttle valves 308 and 309 are manipulated in relation to the degree of depression of the acceleration pedal 310.

When the engine 301 is operating in the low or light load, the second throttle valve 309 is completely closed, and the first throttle 308 is slightly opened. Therefore, all of the intake air is led to the turbine 304 through the passage 303. The intake air passed through the turbine 304 is introduced into the respective chamber 302, causing the turbine 304 to rotate. By this rotational motion, the flow energy of the intake air is partly recovered. In other words, torque generated by rotation of the turbine 304 is transmitted to a crank shaft 306, via the belt 305.

Therefore, when the engine 301 is operating with the low load, the engine 301 tends to have a pumping loss. However, this pumping loss is compensated by recovering the flowing energy of the intake air. Therefore, the gas milage is specifically improved, while the engine 301 is operating with low load.

However, according to this conventional system, the volume of intake air flowing into the respective combustion chamber 302 is controlled by the opening magnitude of each throttle valve 308 and 309. Therefore, when the degree of depression of the pedal 310 is small and the second throttle valve 309 is almost completely closed, almost all of the flowing energy of the intake air is consumed by the secondary throttle valve 309. In other words, the intake air flows into the respective chamber 302, through a small gap defined by the throttle valve 308. Furthermore, the intake air impinges against the secondary throttle valve 309. This impingement causes most of the flowing energy of the intake air to be consumed. Therefore, the turbine 304 is not substantially rotated, causing the energy recovery function to be lowered. This resultingly makes the flowing energy of the intake air difficult to recover in the wide range, in which the engine 301 is operating with the low load.

SUMMARY OF THE INVENTION

Accordingly, it is a primary object of the present invention to provide an air-intake control device used in a vehicular engine, which can efficiently recover flowing energy of the intake air from a wide range which the engine is operating with the low load.

To achieve the foregoing and the other objects in accordance with the purpose of the present invention, an air-intake control system for an engine is provided. The system includes an air-intake passage, a turbine, a generator and an air-intake control device. The turbine, which is disposed midway along the passage, is driven by intake air flow and controls a real volume of intake air flowing in the passage by way of its rotational motion. The generator generates electric energy in accordance with the action of the turbine. Further, the generator depresses the action of the turbine in proportion to the magnitude of generated energy. The air-intake control device controls the generator to increase the magnitude of the electric energy generated in response to a decrease of a flow volume of the intake air from a required intake air volume determined in accordance with an operating condition of the engine.

BRIEF DESCRIPTION OF THE DRAWINGS

The features of the present invention that are believed to be novel are set forth with particularity in the appended claims. The invention, together with the objects and advantages thereof, may best be understood by reference to the following description of the presently preferred embodiments, together with the accompanying drawings, in which:

DETAILED DESCRIPTION OF THE PREFERRED EMBODIMENTS

Eight preferred embodiments of the present invention will now be described. Basic mechanical and electronic concepts of an air-intake control device 10 according to the present invention will be described in the first embodiment. The second through eighth embodiments will emphasize the differences, with respect to the first embodiment.

First Embodiment

The first embodiment of an air-intake control system according to the present invention will now be described, referring to FIG. 1.

Figure 1:
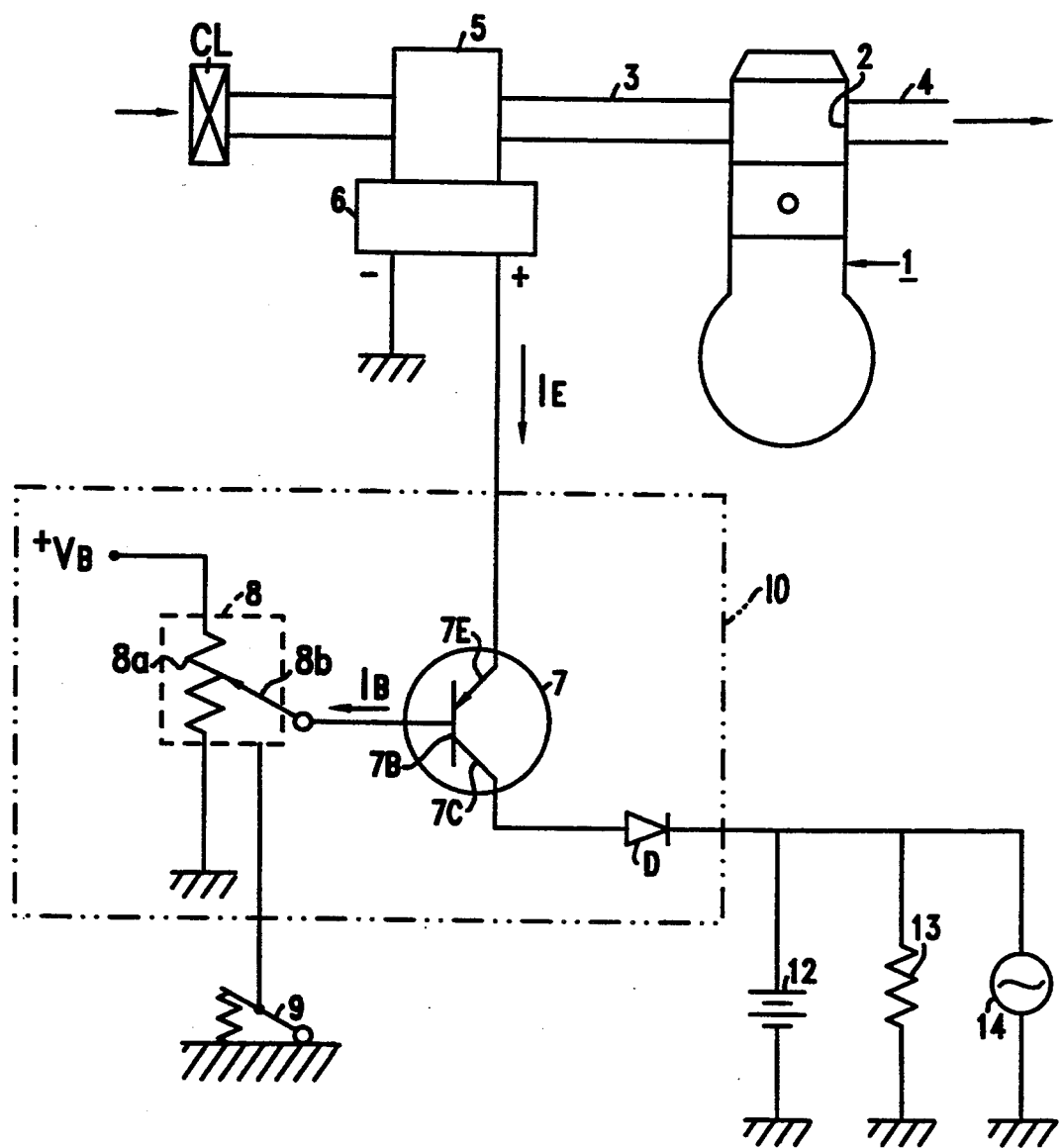
FIG. 1 is a schematic plan view illustrating an air-intake control system of the first embodiment including an air-intake control device for a vehicular engine.

As shown in FIG. 1, an engine 1 includes a plurality of combustion chambers 2 (only one combustion chamber is shown). Each one of the combustion chambers 2 communicates with an air-intake passage 3. Fresh air cleaned by an air cleaner (CL) is introduced into the respective combustion chamber 2, via the passage 3. Exhaust gas generated in the chamber 2 is discharged to the outside of the engine 1, via an exhaust passage 4. An air motor 5, which is incorporated with a displacement type pump, is disposed midway along the passage 3 (to simplify the explanation, hereinafter, the air motor 5 is referred to as a turbine 5, because the essential portion of the air motor 5 is incorporated with the turbine). Flow of intake air causes the turbine 5 to rotate. The flow volume of intake air is regulated by the rotational motion of the turbine 5, such that the rotational motion thereof acts as resistance against the intake air flow.

A generator 6 is mounted on the output shaft of the turbine 5, so as to generate electric energy in response to the rotational motion of the turbine 5. The generator 6 is electrically connected to an air-intake control device 10.

The air-intake device 10 will now be described. The device 10 includes a transistor 7. A negative electrode of the generator 6 is grounded. A positive electrode of the generator 6 is connected to an emitter 7E of the transistor 7. Furthermore, the generator 6 has a function, other than generation of electricity, such as to regulate the rotational motion of the turbine 5. The ability for controlling the rotational motion of the turbine 5 can be evaluated proportionally to the magnitude of electric energy generated by the generator 6. In other words, as the electric energy generated is small, the ability to control the rotation decreases. As the electric energy generated is large, the ability to control the rotation increases. Therefore, when the ability to control the rotation decreases, the turbine 5 rotates much easier. This easier rotation of the turbine 5 causes the flow volume of intake air to increase. On the contrary, when the ability to control the rotation increases, the turbine 5 becomes less rotatable, so as to decrease the flow volume of intake air.

A base 7B of the transistor 7 is connected to an output terminal of a potentiometer 8. A collector 7C of the transistor 7 is connected to a battery 12, via a diode (D). The transistor 7 controls the current flow (emitter current (IE)) delivered from the generator 6, in relation to the current (base current (IB)) which is applied on the base 7B. In other words, the transistor 7 controls the generation of electric energy by the generator 6. The transistor 7 supplies the emitter current (IE) to the battery 12, via the diode (D).

The potentiometer 8 includes a resistor 8a and a sliding element 8b. The resistor 8a is connected to a constant-voltage source (VB) at its first end, and grounded at its second end. An acceleration pedal 9 is connected to the sliding element 8b. Therefore, the element 8b slides on the resistor 8a, in relation to the degree of depression or displacement of the pedal 9. The divided voltage from the VB is applied on the base 7B, via the output terminal thereof. According to this embodiment, as the degree of depression of the pedal 9 is small, the element 8b is slid toward the ground side of the resistor 8a (downward in FIG. 1). As the degree of depression of the pedal 9 increases, the element 8a is slid toward the VB (upward in FIG. 1). As the degree of depression of the pedal 9 increases (i.e., as the element 8b upwardly slides), this motion causes the potentiometer 8 to increases the electric potential of the base 7B. On the contrary, as the degree of depression of the pedal 9 decreases (i.e., as the element 8b downwardly slides), this motion causes the potentiometer 8 to decrease the electric potential of the base 7B.

The battery 12 connects to a vehicle electric load 13 and an alternator 14. Therefore, the electric energy generated by the generator 6 is supplied to the battery 12 and the load 13. The diode (D) protects the transistor 7 from the reverse voltage originated from the battery 12 and the alternator 14.

Operations according to this embodiment will be hereinafter described.

When the degree of depression of the pedal 9 is small, (i.e., when a flow volume of intake air requested by the engine 1 is small), the element 8b downwardly slides. This downward movement causes the potential of the base 7b of the transistor 7 to decrease. Therefore, the base current (IB) increases, in response to the decrement of potential of the base 7B. Consequently, the output of generated energy by the generator 6 increases, in relation to the increment of the emitter current (IE). Therefore, as the magnitude for controlling the rotation of the generator 6 increases, the turbine 5 becomes less rotatable. As a result, the intake air becomes slightly difficult to flow through the respective turbine 5, such that the flow volume of intake air flowing to the combustion chamber 2 decreases.

On the contrary to the above, when the degree of depression of the pedal 9 is large (i.e., when the flow volume of intake air requested is large), the element 8b slides upwardly. This upward movement causes the potential of the base 7b to increase. Therefore, the emitter current (IE) decreases, in response to the increment of potential of the base 7B. Thus, the magnitude for controlling the rotation of the generator 6 decreases, such that the turbine 5 rotates easier. As a result, the intake air becomes much easier to flow through the turbine 5, such that the volume of intake air flowing to the chamber 2 increases.

As described above, according to this embodiment, the turbine 5 converts part of flowing energy of the intake air into the rotational energy. The generator 6 converts this rotational energy into the electric energy. This converted electric energy is supplied to the battery 12 and the vehicle electric load 13. Therefore, the part of flowing energy of the intake air can be efficiently utilized as the resultant electric energy.

According to this embodiment, the element 8b slides in response to the degree of depression of the pedal 9, so as to vary the base current (IB). Based on this variation, the emitter current (IE) is regulated, causing the generator 6 to vary the output of generated energy. The volume of intake air flowing into the combustion chamber 2 is thus controlled. Consequently, along with the recovery of the flowing energy of the intake air, the flow volume of intake air can be controlled. Therefore, in addition to the commonly used conventional throttle valve, this air-intake system can control the flow volume of intake air.

Furthermore, controlling the volume of intake air can be achieved by employing only the above construction and replacing or eliminating the conventional throttle valve. As a result, the loss of flowing energy of the intake air caused by the conventional throttle valve can be prevented, when the engine 1 is operating within the low load range. Therefore, the flowing energy of the intake air including the previously lost energy can be efficiently recovered, in the wider range of load.

According to this embodiment, the electric energy converted from the part of the flowing energy of the intake air is recovered. Therefore, under the uniform conditions, such as a condition of equal pressure and equal capacity of air, as the recovery of the converted electric energy increases, the flowing energy of the intake air downstream from the turbine 5 decreases. The intake air temperature downstream from the turbine 5 decreases, in response to the decrement of flowing energy of the intake air. As a result, generation of nitrogen oxide (NOx) by combustion is decreased.

Specifically, as the temperature of intake air is lowered while the engine 1 is operating under the partial load, the peripheral wall of the air-intake passage 3 is cooled down. Therefore, even in the period when the engine 1 operates with a full load from the cooled down condition, the cooled down peripheral wall of the passage 3 prevents the intake air temperature from rising. As a result, the volumetric efficiency can be increased. Therefore, the acceleration ability can be improved.

Furthermore, according to this embodiment, the temperature at the compression dead center within the combustion chamber 2 can be lowered. Therefore, knocking is reduced.

Conventionally, a control region is provided in the ignition timing zone, in order to avoid the knocking occurrence. However, the reduced possibility of knocking allows the control region to be narrowed. Thus, the overall combustion efficiency of the engine 1 can be improved.

Second Embodiment

The second embodiment of an air-intake control system according to the present invention will now be described, referring to FIGS. 2 through 6. It is to be noted that the basic concept of the air-intake control device 10 according to the second embodiment is significantly similar to that of the first embodiment.

Figure 2:
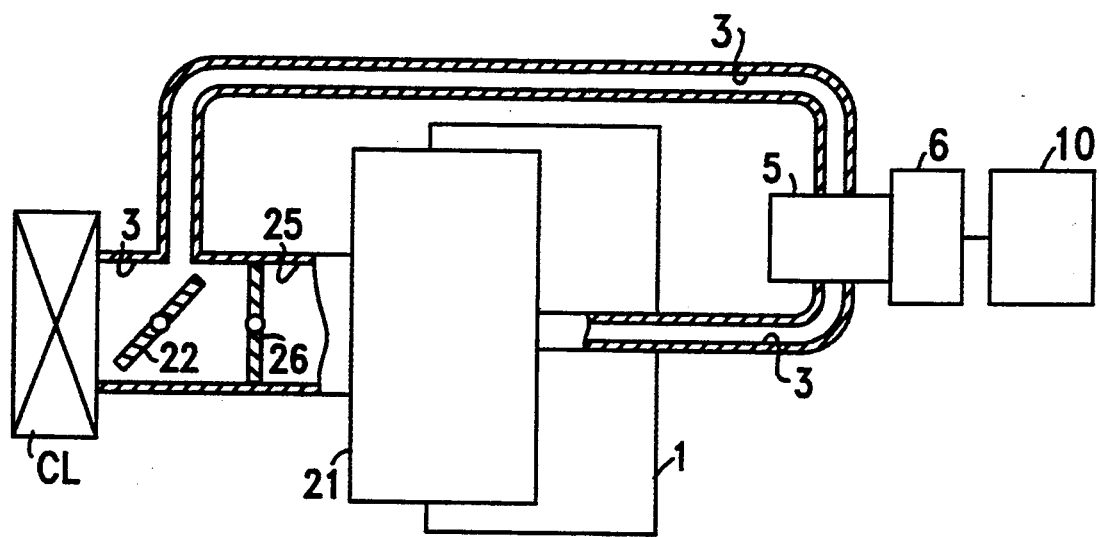
FIG. 2 is a schematic view illustrating an air-intake control system of the second embodiment including an air-intake control device for a vehicular engine.
Figure 3:
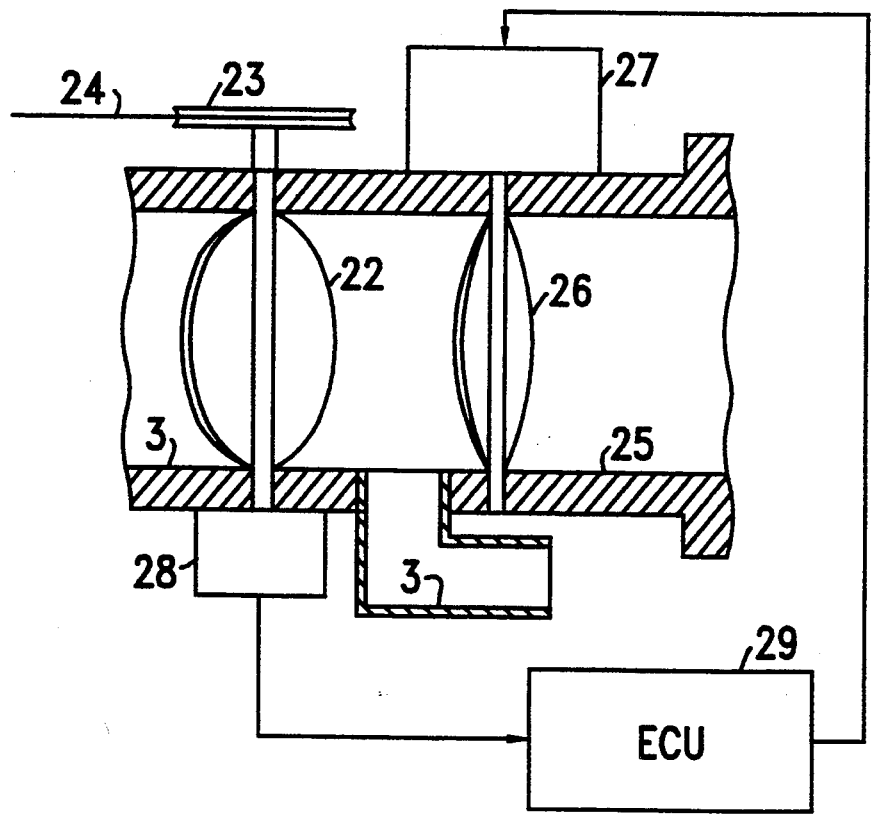
FIG. 3 is a schematic view illustrating an air-intake control system including an electronic control unit (ECU) for an engine.

As shown in FIGS. 2 and 3, a surge tank 21 is provided midway along the air-intake passage 3 of the engine 1, so as to absorb pulsation of the intake air. The turbine 5 is provided along the passage 3, at upstream from the surge tank 21. The generator 6 is mounted on the shaft of the turbine 5. Likewise the first embodiment, the air-intake control device 10 is electrically connected to the generator 6.

A primary throttle valve 22 is provided along the passage 3 upstream from the surge tank 21. The degree of depression of the acceleration pedal 9, which a driver manipulates (e.g., referred to FIG. 1) controls the opening magnitude of the throttle valve 22. In the other words, a link 23 is coaxially provided on the shaft of the throttle valve 22. The link 23 is operably connected to the pedal 9, via a wire 24. The link 23 is rotated in relation to the degree of depression of the pedal 9, which is manipulated by the driver. The flow volume of intake air at downstream from the valve 22 is controlled by manipulating the opening magnitude of the throttle valve 22.

A by-pass passage 25 is branched away from the passage 3, in order to by-pass the turbine 5. The by-pass passage 25 communicates the surge tank 21 with the downstream side of the primary throttle valve 22. A secondary throttle valve 26 is disposed midway along the by-pass 25. A stepping motor 27 for driving the valve 26 is provided in the vicinity of the throttle valve 26.

A throttle sensor 28 is mounted on the rotational shaft of the valve 22, which is located at the opposite position with respect to the link 23. This throttle sensor 28 detects an opening magnitude of the primary throttle valve 22 (THP), which corresponds to a requested opening magnitude of the throttle valve 22 in accordance with the degree of depression of the pedal 9.

Figure 4:
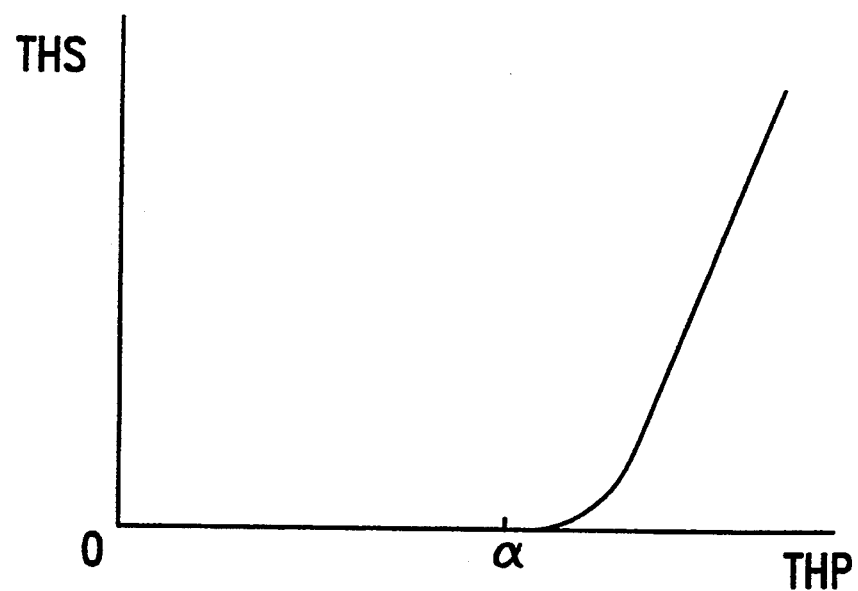
FIG. 4 is a characteristic map of the correlation between an opening magnitude of a primary throttle valve and a basic opening magnitude of a secondary throttle valve.
Figure 5:
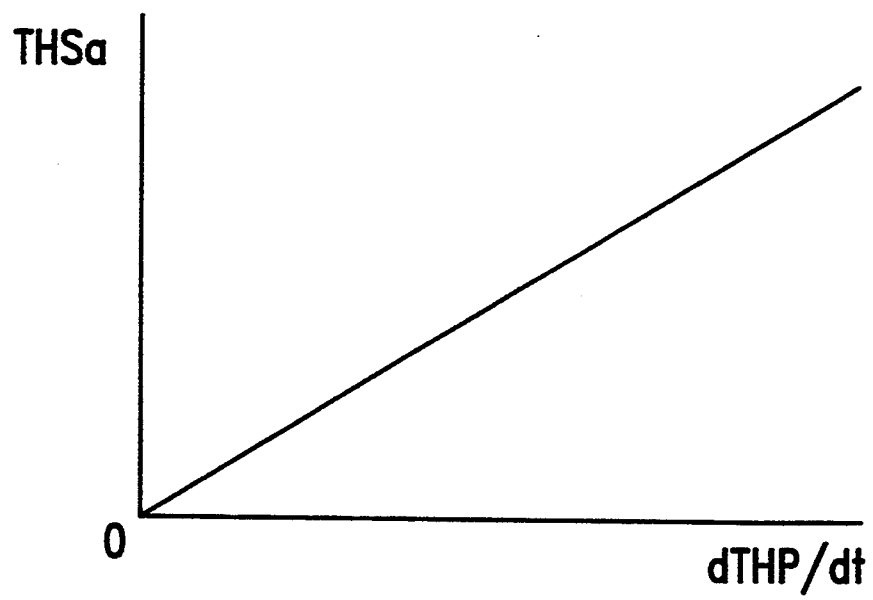
FIG. 5 is a characteristic map of the correlation between a variation per unit time of the opening magnitude of the primary throttle valve and a correction value for the opening magnitude of the secondary throttle valve.

The throttle sensor 28 is electrically connected to the input side of the electronic control unit (ECU) 29. The ECU 29 includes a central processing unit (CPU), a read only memory (ROM), a random access memory (RAM), a backup RAM, an input interface circuit, an output interface circuit, and data buses which mutually connect between the circuits and the those units (not shown). The ECU 29 properly drives the stepping motor 27, in accordance with a detected signal by the throttle sensor 28. Maps shown in FIGS. 4 and 5 are stored in the ECU 29, in advance. The ECU 29 controls the operation of the stepping motor 27, in accordance with those maps. FIG. 4 is a characteristic map showing the correlation of a standard opening magnitude (standard secondary opening magnitude (THS)) of the secondary throttle valve 11 with respect to a primary throttle opening magnitude (THP). FIG. 5 is a characteristic map showing the correlation of a correction value (THSa) for the opening magnitude of the secondary throttle valve 26 with respect to a variation (dTHP/dt) per unit time of the primary throttle opening magnitude (THP). The ECU 29 drives the motor 27, such that the current opening magnitude of the secondary throttle valve 26 (secondary throttle opening magnitude THS1) is defined by adding a correction value (THSa) to the standard secondary opening magnitude (THS).

An operation for controlling air-intake which is executed by the ECU 29, referring to the maps of FIGS. 4 and 5, and a flowchart of FIG. 6, will now be described.

Figure 6:
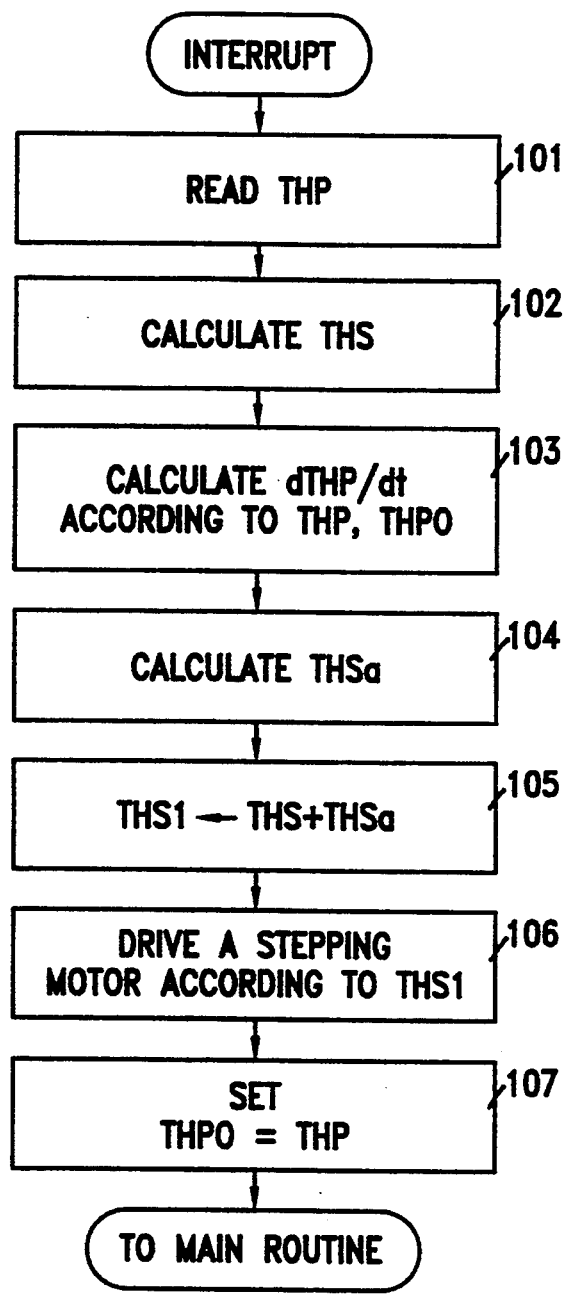
FIG. 6 is a flowchart of an air-intake control routine executed by the ECU.

FIG. 6 is a flowchart explaining an air-intake control routine that is executed by the ECU 29. The ECU 29 periodically requests the execution of this routine as an interrupt operation, to a main routine by predetermined intervals.

The ECU 29 starts executing a routine described in FIG. 6, in response to the interrupt request.

In the beginning, the ECU 29 loads or reads a primary throttle opening magnitude (THP) detected by the throttle sensor 28 (step 101).

The ECU 29 calculates a standard secondary opening magnitude (THS), based on the loaded primary throttle opening magnitude (THP) in accordance with the map in FIG. 6 (step 102).

The ECU 29 calculates a variation (dTHP/dt) per unit time of the primary throttle opening magnitude (THP), based on the primary throttle opening magnitude (THP) and the primary throttle opening magnitude (THP0) stored at the previous routine (step 103).

The ECU 29 calculates a correction value (THSa) for the secondary throttle valve opening magnitude based on the variation (dTHP/dt) in accordance with the map in FIG. 5 (step 104).

The ECU 29 performs the addition between the standard secondary throttle opening magnitude (THS) and the correction value (THSa), and sets this sum or result of addition as a secondary throttle opening magnitude (THS1) (step 105).

The ECU 29 drives the stepping motor 27 in accordance with the secondary throttle opening magnitude (THS1), such that the opening magnitude of the secondary throttle valve 26 coincides with the secondary throttle opening magnitude (THS1) set in step 105 (step 106).

The ECU 29 sets the primary throttle opening magnitude (THP) of this routine as a primary throttle opening magnitude (THP0) for a next interrupt routine, and stores it (step 107). Then, the ECU 29 terminates this routine, and returns to the main routine.

In this way, the ECU 29 drives the stepping motor 27, in order to regulate an opening magnitude of the secondary throttle valve 26. For example, when the degree of depression of the acceleration pedal 9 is small, and the engine 1 is operating at slow speed in a low or light load condition, a request throttle opening magnitude determined by the throttle sensor 28 is small. In this case, a primary throttle opening magnitude (THP) is also small. Therefore, under this condition, a standard secondary opening magnitude is set to "0". When the degree of depression of the pedal 9 is substantially kept constant, a respective correction value (THSa) is also set to "0". Therefore, the ECU 29 drives the stepping motor 27, such as the secondary throttle opening magnitude (THS1) is to coincide with "0". Consequently, the by-pass passage 25 is to be shut or closed. Therefore, the fresh air cleaned by the air cleaner (CL) is introduced into the surge tank 21, only through the air-intake passage 3 and the turbine 5. At this time, the turbine 5 is forced to rotate in relation to the flow volume of intake air. The generator 6 converts this generated rotational energy into the electric energy. This converted electric energy is recovered by means of charging the battery 12, via the air-intake control device 10 (referring to FIG. 1).

On the contrary, when the degree of depression of the pedal 9 is large, in other words, when the engine 1 is operating at high speed in a high or heavy load condition, a requested throttle opening magnitude determined by the throttle sensor 28 is small. In this case, a primary throttle opening magnitude (THP) is large. When the primary throttle degree of depression (THP) exceeds a standard value (α), the raise of the standard secondary opening magnitude (THS)a can be indicated by a substantially quadratic line. However, when the operation magnitude of the pedal 9 is kept substantially constant, a respective correction value (THSa) is set to "0". Therefore, the ECU 29 drives the stepping motor 27, such that the primary throttle opening magnitude (THP) becomes proportional to the opening magnitude of the secondary throttle valve 26. Consequently, the by-pass 25 is opened. Therefore, the cleaned intake air by the air cleaner (CL) is introduced into the surge tank 21 through the air-intake passage 3 and the turbine 5, in addition to through the by-pass passage 25.

In the case that the degree of depression of the pedal 9 is suddenly changed from a small amount to the thoroughly thrust position (i.e., a large amount) when the rapid acceleration is required, the ECU 29 determines that the increment of request throttle opening magnitude is increased in accordance with the detection result of the throttle sensor 28. In other words, the ECU 29 determines that a variation (dTHP/dt) per unit time of the primary throttle opening magnitude (THP) becomes large. Therefore, in this case, a correction value (THSa) for an opening magnitude of the secondary throttle valve 26 according to the map in FIG. 5 becomes large. At this time, even if the secondary opening magnitude (THS) is small, as a result, the secondary throttle opening magnitude (THS1) becomes large, because the respective correction value (THSa) is large. In other words, when the pedal 9 is rapidly thrust in deep or by large magnitude, the secondary throttle valve 26 is immediately opened. Therefore, the cleaned intake air by the cleaner (CL) is directly introduced into the surge tank 21 through the by-pass 25. Consequently, the required air is promptly introduced into the respective combustion chambers of the engine 1. Therefore, a vehicle is accelerated without delay.

As clearly described above, the air-intake control system in this embodiment can achieve similar operation and effectiveness to those achieved in the first embodiment.

Furthermore, according this embodiment, the secondary throttle opening magnitude (THS1) at that time is to be set by adding the correction value (THSa) in relation to the increasing speed of the requested throttle opening magnitude to the standard secondary opening magnitude (THS). In the case that the pedal 9 is rapidly thrust for gaining the rapid acceleration, while the engine 1 is operating at low speed in the low or light load condition, a correction value (THSa) for the opening magnitude of the secondary throttle valve 26 is increased. As a result, the secondary throttle opening magnitude (THS1) becomes large. Therefore, the cleaned air by the air cleaner (CL) can be directly introduced into the surge tank 21, through the by-pass 25. As a result, the required amount of intake air can be promptly obtained. Therefore, the acceleration ability can be improved.

Third Embodiment

Figure 7:
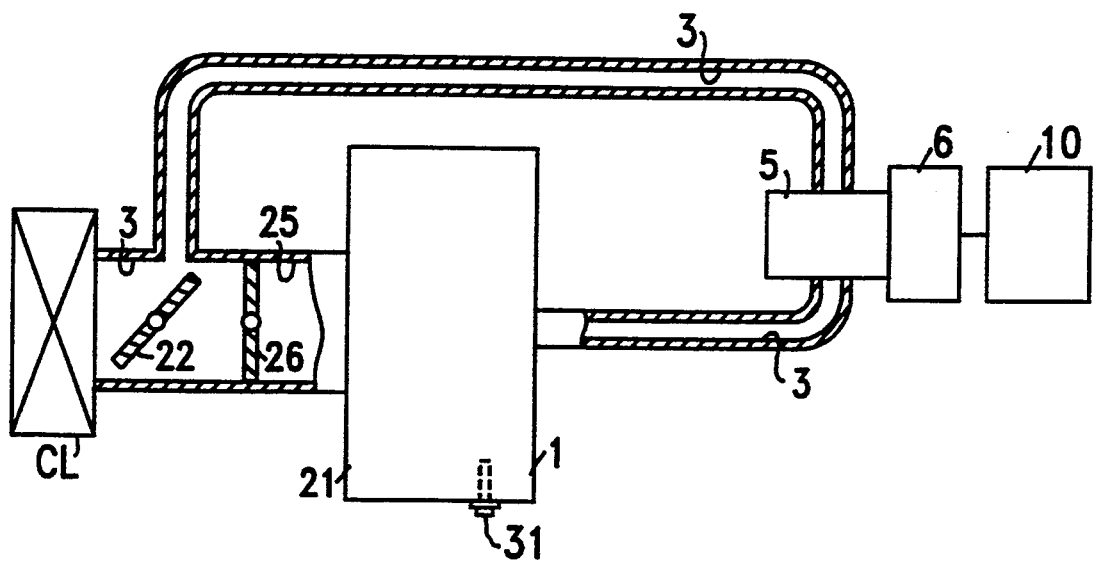
FIG. 7 is a schematic view illustrating an air-intake control system of the third embodiment, including an air-intake control device for a vehicular engine.
Figure 8:
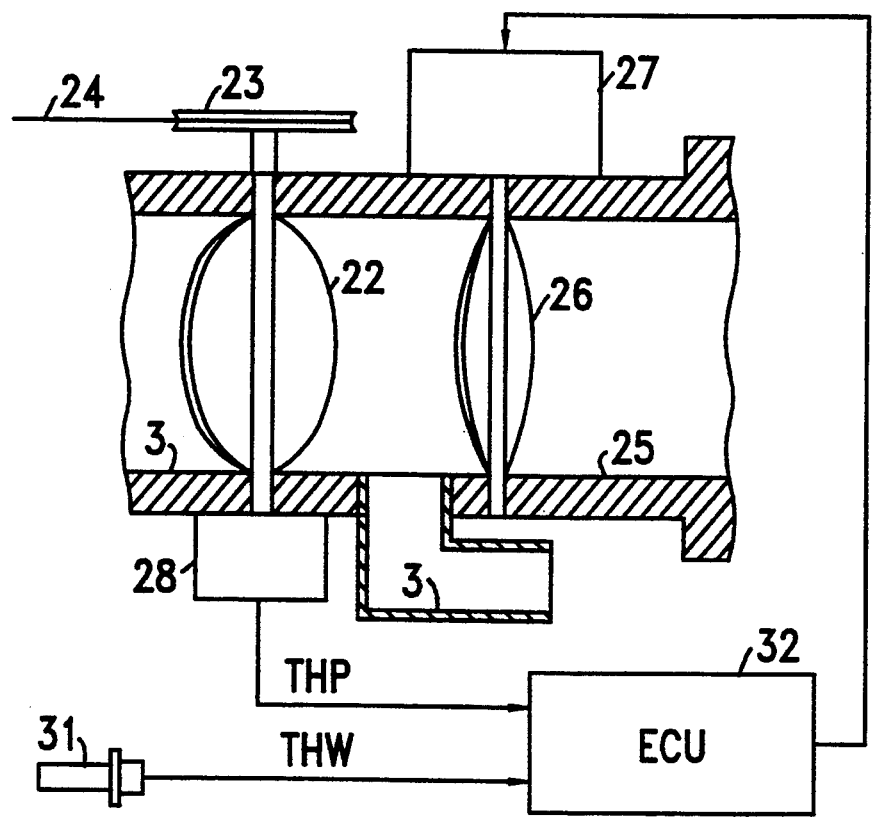
FIG. 8 is a schematic view illustrating an air-intake control system including an electronic control unit (ECU) for an engine.

The third embodiment of an air-intake control system according to the present invention will now be described, referring to FIGS. 7 through 9. The basic concept of the air-intake control device 10 according to the third embodiment is significantly similar to that of the first embodiment. The basic concepts of the air-intake passage 3 and the by-pass passage 25 are significantly similar to those of the second embodiment.

According to this embodiment, an electronic configuration of the air-intake control system mainly differs from that of the second embodiment. As shown in FIGS. 7 and 8, a water inlet housing (not shown) includes a coolant temperature sensor 31. The temperature sensor 31 includes a thermistor therein. The temperature sensor 31 detects coolant temperature (THW) as the temperature of the intake air.

An ECU 32 drives the stepping motor 27, based on a detected signal by the temperature sensor 31. This drive causes the secondary throttle valve 26 to be manipulated or rotated.

Further, the ECU 32 drives the stepping motor 27, in order to properly regulate the opening magnitude of the secondary throttle valve 27. In other words, the maps in FIGS. 4 and 5 described in the second embodiments are pre-stored in the ROM of the ECU 32. The ECU 32 drives the stepping motor 27, in accordance with those maps.

An operation for controlling air-intake performed by the ECU 32 will now be described.

Figure 9:
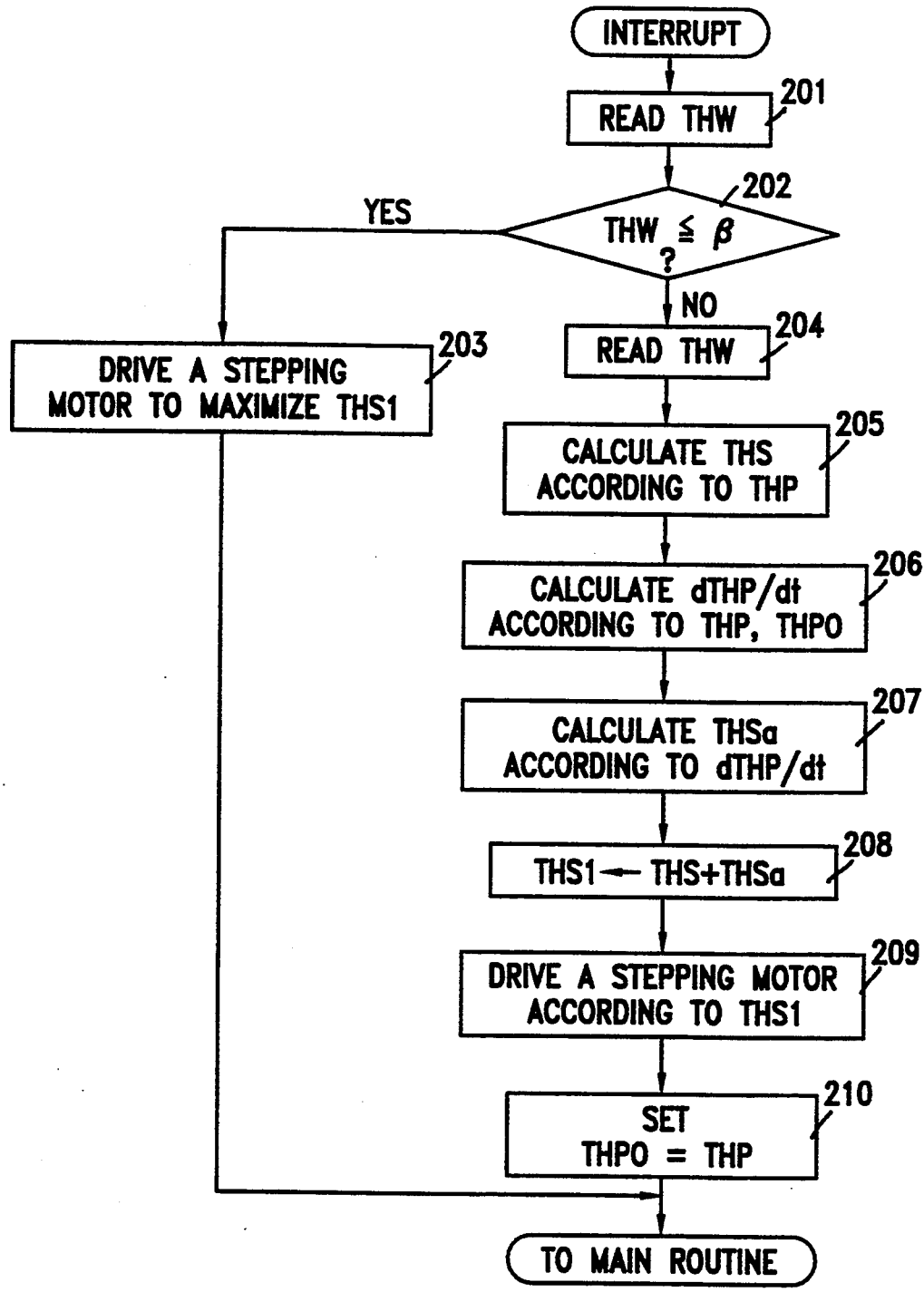
FIG. 9 is a flowchart showing an air-intake control routine that is executed by the ECU.

A flowchart in FIG. 9 shows the execution steps of an interrupt routine, which is periodically requested to the main routine by predetermined intervals, similar to the interrupt execution in FIG. 6.

The ECU 32 loads or reads a coolant temperature (THW) detected by the sensor 31, based on the interrupt request (step 201).

The ECU 32 determines whether the read coolant temperature (THW) is less than or below the predetermined coolant temperature ($\beta$) (step 202). This predetermined coolant temperature ($\beta$) is defined by previously conducted experiments, and is the minimum temperature within its tolerance. In other words, the predetermined temperature ($\beta$) can be defined as follow; when the flowing energy of the intake air is recovered, and if this recovery causes the coolant temperature to exceed or rise above the predetermined coolant temperature ($\beta$), un-burnt hydro-carbon and carbon monoxide (CO) in the exhaust gas significantly boost. When the coolant temperature (THW) is less than the predetermined temperature ($\beta$), the ECU 32 determines that the engine 1 is currently in the cold condition.

The ECU 32 drives the stepping motor 27, such that the secondary throttle opening magnitude (THS1) is to become maximum (step 203). Therefore, the secondary throttle valve 26 is completely opened, which causes the by-pass passage 25 to be completely opened. Consequently, almost all of the intake air after cleaned by the air cleaner (CL) is directly introduced into the surge tank 21 through the by-pass 25, without flowing through the air-intake passage 3.

On the other hand, the ECU 32 determines that the engine 1 is not currently in the cold condition, when the coolant temperature (THW) is above or more than the predetermined coolant temperture ($\beta$) at step 202.

Hence, the ECU 32 executes the instructions of steps 204 through 210, similar executions to the steps 101 through 107 of FIG. 6 according to the second embodiment. In other words, the ECU 32 loads or reads a primary throttle opening magnitude (THP), based on the detected result by the throttle sensor 28 (step 204).

The ECU 32 calculates a standard secondary opening magnitude (THS) based on the primary throttle opening magnitude (THP), in accordance with the map in FIG. 4, (step 205).

The ECU 32 calculates a variation (dTHP/dt) per unit time of the primary throttle opening magnitude (THP), based on the primary throttle opening magnitude (THP) and the primary throttle opening magnitude (THP0) stored at the previous routine (step 206).

The ECU 32 calculates a correction value (THSa) for an opening magnitude of the secondary throttle valve 26 based on the variation (dTHP/dt), in accordance with the map in FIG. 5, (step 207).

The ECU 32 performs the addition between the standard secondary throttle opening magnitude (THS) and the correction value (THSa), and sets this sum or result of addition as a secondary throttle opening magnitude (THS1) (step 208).

The ECU 32 drives the stepping motor 27 based on the secondary throttle opening magnitude (THS1), such that the opening magnitude of the secondary throttle valve 26 coincides with the secondary throttle opening magnitude (THS1) set in step 208 (step 209).

The ECU 32 sets the primary throttle opening magnitude (THP) of this routine as a primary throttle opening magnitude (THP0) for a next interrupt routine, and stores it (step 210). Then, the ECU 32 terminates this routine, and returns to the main routine.

As clearly described above, according to the air-intake control system of this embodiment, this inventive device can achieve similar operation and effectiveness to those achieved in the first and second embodiments. Furthermore, this system can achieve following operation and effectiveness.

According to this embodiment, the ECU 32 drives the stepping motor 27, in response to the intake air temperature (coolant temperature (THW)) at that time or the primary throttle opening magnitude (THP). The secondary throttle valve 26 is preferably manipulated its opening magnitude, in response to this drive of the stepping motor 27.

In other words, according to this embodiment, when the coolant temperature (THW) is below or less than the predetermined temperature ($\beta$), the ECU 32 determines that the engine 1 is currently in the cold condition. The ECU 32 drives the stepping motor 27 so as to maximize the secondary throttle opening magnitude (THS1), regardless of the primary throttle opening magnitude (THP). This drive causes the secondary throttle valve 26 to be completely opened. Therefore, the by-pass 25 is completely opened. Consequently, almost all of the intake air cleaned by the air cleaner (CL) is directly introduced into the surge chamber 21 through the by-pass 25, without flowing through the air-intake passage 3. The turbine 5, the generator 6 and the air-intake control device 10, etc. do not consume the flowing energy of the intake air, which does not flow through the turbine 5 within the passage 3. The temperature of the intake air will not drop due to consumption of the flowing energy of the intake air. Therefore, the engine 1 can be rapidly warmed up. Furthermore, the fuel can be rapidly changed into the misty form for increasing burning speed. As a result, even when the engine 1 is in the cold condition, un-burnt hydro-carbon and carbon monoxide (CO) in the exhaust gas can be effectively reduced.

The catalyst (not shown) disposed midway along the exhaust passage 4 (referring to FIG. 1) can be rapidly warmed up, in relation to the rapid warming up of the engine 1. Consequently, the greater part of the hydrocarbon and carbon monoxide (CO) in the exhaust gas can be filtered or purified by the catalyst. As a result, the hydro-carbon and the carbon monoxide (CO) in the exhaust gas discharged from the passage 4 can be substantially reduced.

Fourth Embodiment

The fourth embodiment of an air-intake control system according to the present invention will now be described, referring to FIG. 10. The basic concept of the air-intake control device 10 according to the fourth embodiment is significantly similar to that of the first embodiment.

Figure 10:
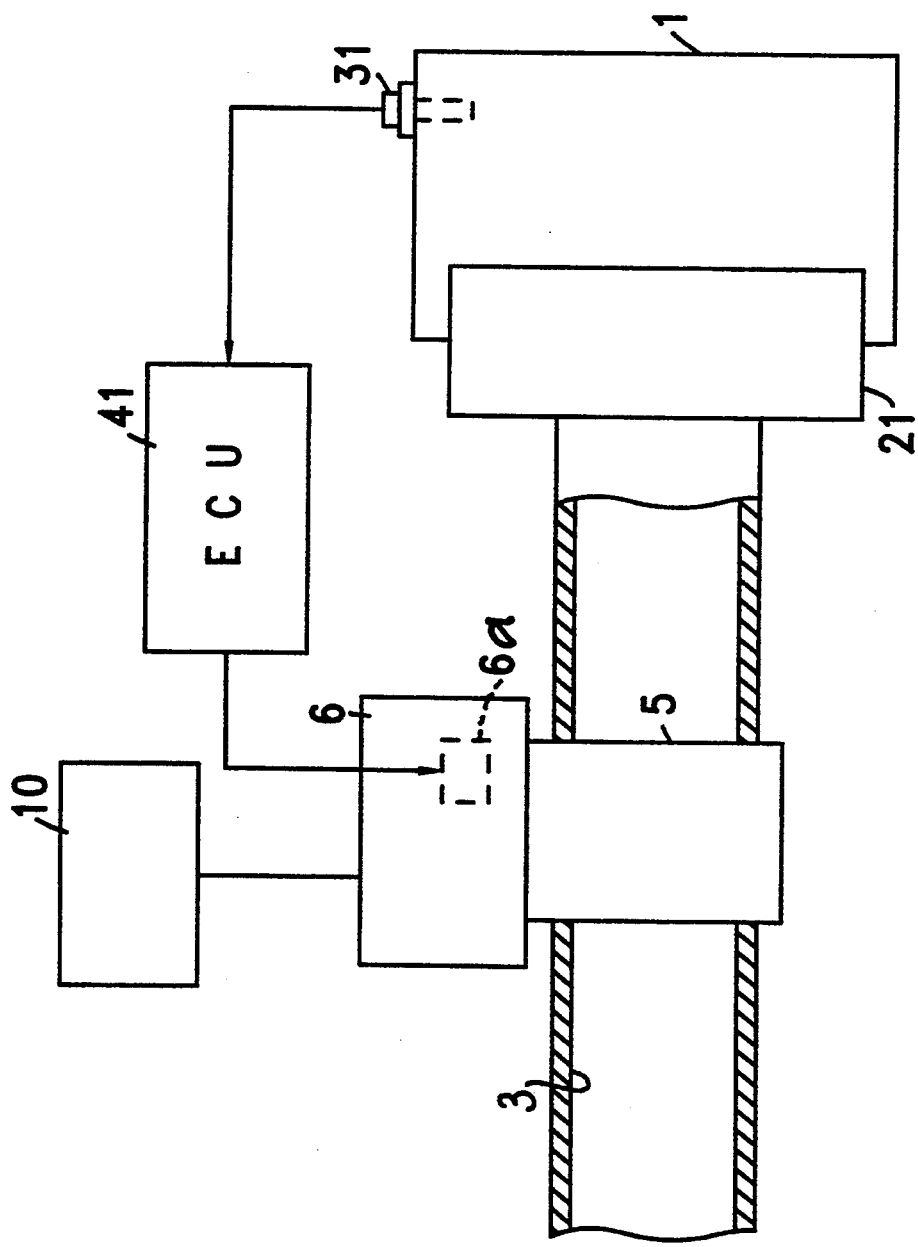
FIG. 10 is a schematic view illustrating an air-intake control system of the fourth embodiment, including an air-intake control device and the ECU for a vehicular engine.

As shown in FIG. 10, according to this embodiment, the by-pass passage is eliminated. This is a major difference relating to the third embodiment. The generator 6 operably connected to the output shaft of the turbine 5 includes a switch 6a. The switch 6a activates or deactivates the generator 6 to generate electric energy.

Further, according to this embodiment, an ECU 41 is provided to control the generation of electric energy by the generator 6. The ECU 41 loads or reads the detected result from the coolant sensor 31. The ECU 41 causes the switch 6a to be "ON" or "OFF" (i.e., activate or deactivate), in accordance with the detected coolant temperature (THW).

The characteristic operation according to this embodiment will now be described.

When the coolant temperature (THW) detected by the sensor 31 is above the predetermined temperature ($\beta$) (referring to the third embodiment), the ECU 41 sets the switch 6a to be "ON". Hence, the rotational energy is generated by the turbine 5, which is forced to rotate by the intake air flow. Then, the rotational energy is transmitted to the generator 6 to convert it into the electric energy.

On the other hand, when the coolant temperature (THW) is below or less than the predetermined temperature ($\beta$), the ECU 41 sets the switch 6a to be "OFF". Therefore, the generator 6 stops to convert or generate the electric energy. Consequently, the turbine 5 rotates without any torque applied. Therefore, the flowing energy of the intake air will not be recovered by the generator 6. Accordingly, at the cold period, further temperature drop of the intake air due to recovering the flowing energy of the intake air will be prevented, similar to the third embodiment. As a result, the hydro-carbon and the carbon monoxide (CO) in the exhaust gas discharged from the passage 4 can be substantially reduced.

Fifth Embodiment

The fifth embodiment of an air-intake control system according to the present invention will now be described, referring to FIGS. 11 through 14. The basic concept of the air-intake control device 10 according to the fifth embodiment is significantly similar to that of the first embodiment.

Figure 11:
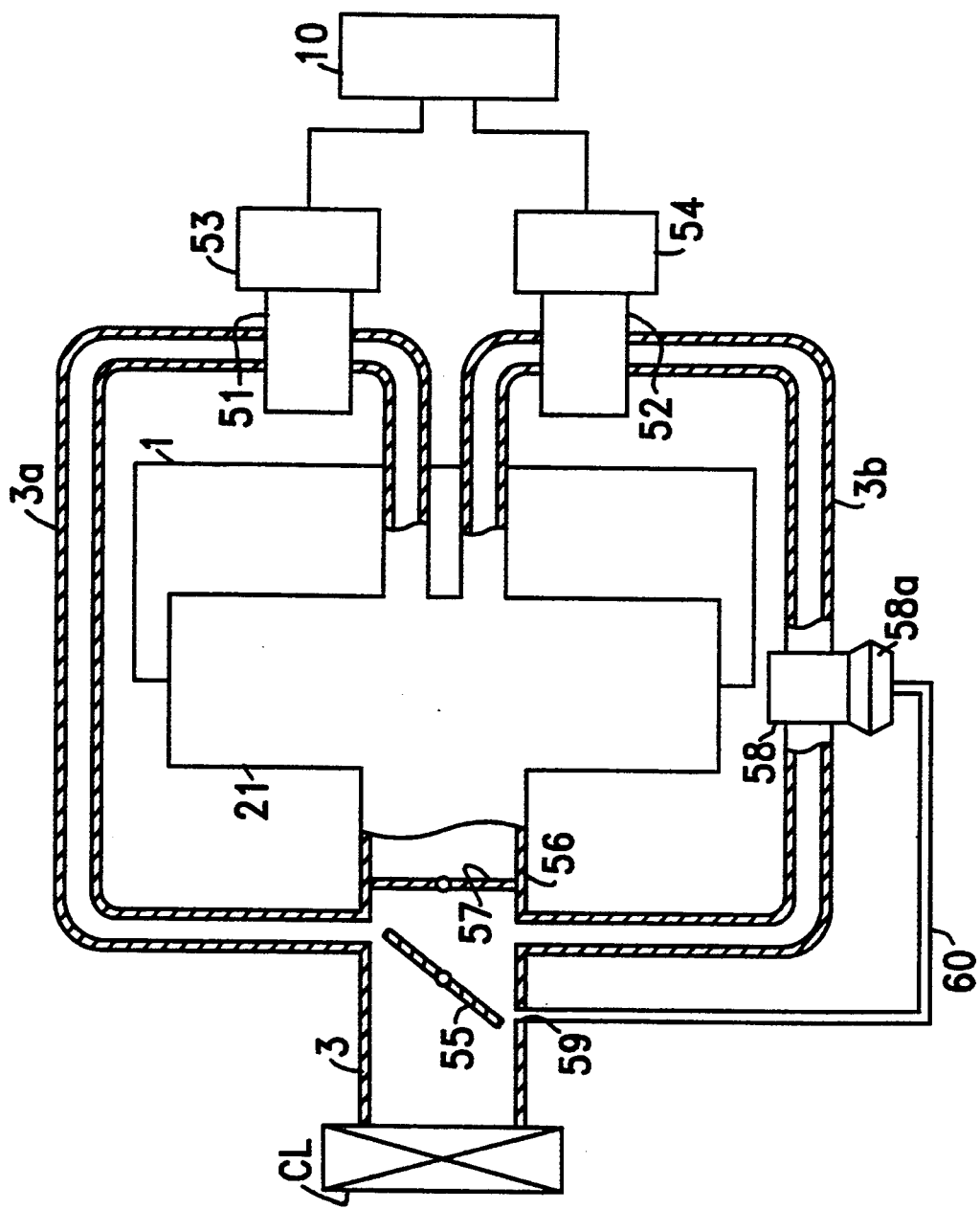
FIG. 11 is a schematic view illustrating an air-intake control system of the fifth embodiment, including an air-intake control device for a vehicular engine.

As shown in FIG. 11, the air-intake passage 3 is divided (branched away) into two passages; a main air-intake passage 3a and a secondary air-intake passage 3b. A pair of turbines 51 and 52 are disposed midway along the main and secondary passages 3a and 3b, respectively, in parallel to the air-intake passage 3. These turbines 51 and 52 are minimized in entire dimensions, in order to receive the smallest amount of resistance generated by their own mass of inertia. The generators 53 and 54 are mounted on the output shafts of the turbines 51 and 52, respectively. The rotational energy generated by the rotational motion of the turbines 51 and 52 is converted into electric energy by the generators 53 and 54, respectively.

Each one of the generators 53 and 54 is connected to the air-intake control device 10, which is described in the first embodiment. The converted electric energy charges the battery 12 (referring to FIG. 1), via the air-intake control device 10. Therefore, the electric energy is recovered.

A primary throttle valve 55 is disposed along the passage 3 at the upstream side from the turbines 51 and 52. The opening magnitude of the primary throttle valve 55 is controlled, in relation to the degree of depression of the acceleration pedal 9, which is manipulated by the driver.

A bypass passage 56 is provided along the passage 3 in a branched away manner, in order to detour or bypass the turbines 51 and 52. The by-pass 56 directly connects the downstream side of the primary throttle valve 55 with the surge tank 21. A secondary throttle valve 57 is provided midway along the by-pass 56. An opening magnitude of the secondary throttle valve 57 is controlled, in relation to the degree of depression of the pedal 9, similar to the primary valve 55.

Figure 12:
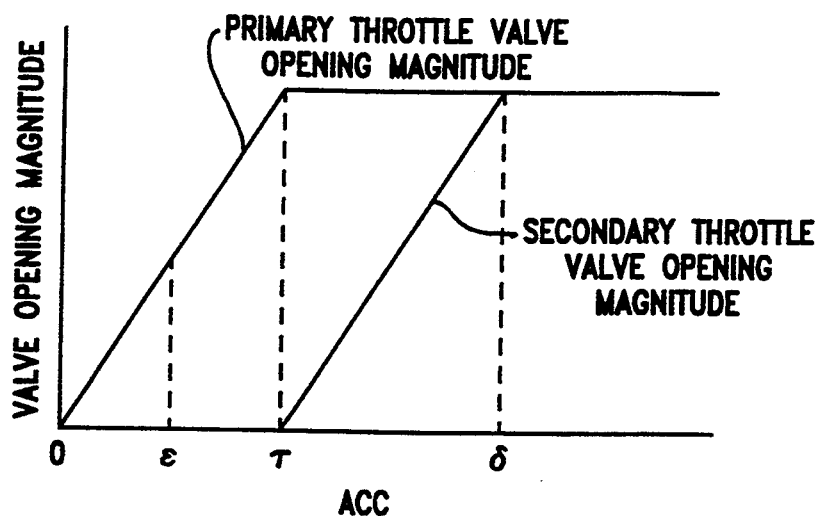
FIG. 12 is a characteristic graph illustrating the correlation between an operation magnitude of the acceleration pedal and an opening magnitude of a valve.

As shown in FIG. 12, in the region which the degree of depression or angle (ACC) of the pedal 9 is small, the opening magnitude of the primary valve 55 increases in proportion to the ACC. When the ACC reaches the predetermined value ($\gamma$), the opening magnitude of the primary valve 55 is maximum. The opening magnitude of the secondary valve 57 increases in proportion to the increase of the ACC, from the point which the opening magnitude of the primary valve 55 is the maximum value ($\gamma$). When the ACC reaches the predetermined value ($\delta$), the opening magnitude of the secondary valve 57 becomes maximum.

Figure 14:
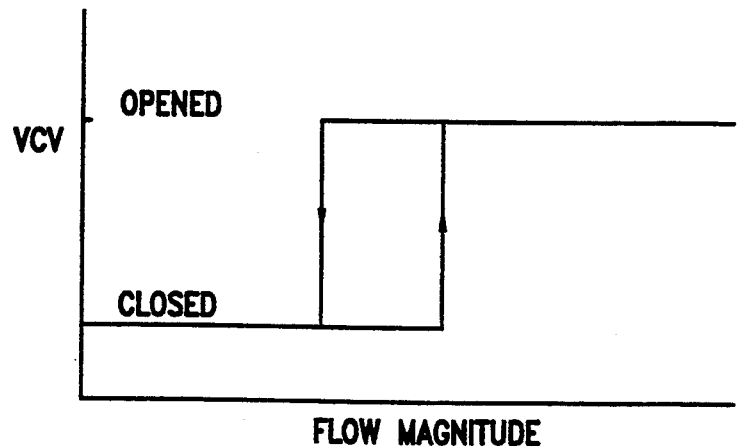
FIG. 14 is a graph showing hysteresis of manipulation of the vacuum control valve (VCV) in relation to the flow volume of intake air.

As shown in FIG. 11, a diaphragm type vacuum control valve (VCV) 58 is disposed midway along the secondary air-intake passage 3b. The VCV 58 includes a diaphragm chamber 58a. The VCV 58 is opened, when the negative pressure having larger pressure than the predetermined value is introduced into the diaphragm chamber 58a. However, as shown in FIG. 14, the VCV 58 is opened with having a fixed hysteresis curve.

As shown in FIG. 11, a negative pressure port 59 is provided along the passage 3, in the vicinity of the primary valve 55. The negative pressure generated when the primary valve 55 is opened, is introduced into the port 59. The port 59 is communicated with the diaphragm chamber 58a of the VCV 58, via a negative pressure passage 60. The flow volume of intake air becomes larger than the predetermined value, when the primary valve 55 is opened to the magnitude more than the predetermined standard value. Therefore, a negative pressure larger than the pressure with the predetermined value is generated around the port 59. This generated negative pressure is led into the diaphragm chamber 58a, via passage 60, and causes the VCV 58 to be opened. The intake air flows through the secondary passage 3b due to opening of the VCV 58, and drives the turbine 52.

The characteristic operation of the air-intake system having the above-described configuration will now be described.

In the region which the ACC of the pedal 9 is small (i.e., the ACC is less than the predetermined value ($\epsilon$) (arbitrary value between zero and the predetermined value ($\gamma$)), the primary valve 55 is slightly opened, and the secondary valve 57 is kept closed. Therefore, the flow volume of intake air flowing through the passage 3 is significantly small. The negative pressure, which is large enough to open the VCV 58, is not generated around the port 59. Therefore, the VCV 58 is kept closed. Consequently, a little intake air flowing the passage 3 flows only through the main passage 3a. Therefore, a little intake air is introduced into the combustion chamber 2 of the engine 1, via the turbine 51 and the surge tank 21. Furthermore, the intake air flowing through the passage 3a drives only the turbine 51 to rotate. The generator 53 is driven, in response to this rotational motion. When the ACC of the pedal 9 is small (i.e., in the region which the flow volume of intake air is small), only one turbine 51 is driven to rotate by the flowing energy of the intake air. This rotational energy is converted into electric energy by the generator 53. The converted electric energy charges the battery 12, in order to recover it.

When the ACC of the pedal 9 is in the middle region (i.e., the ACC is in the region between the predetermined value ($\epsilon$) and the predetermined value ($\gamma$), shown in FIG. 12), the primary valve 55 is halfway opened, and the secondary valve 57 is kept closed. Therefore, the flow volume of intake air flowing through the passage 3 becomes moderate. When the flow volume of intake air becomes more than the predetermined value in the medium region, the generation of negative pressure around the port 59 increases. This generated negative pressure causes the VCV 58 to be opened. The moderate value of intake air flowing through the passage 3 flows both main and secondary passages 3a and 3b, and is led into the combustion chambers of the engine 1, via the turbines 51 and 52, and the surge tank 21. The intake air flowing through the passage 3a drives the turbine 51 to rotate. The generator 53 is driven, based on this rotational motion. Simultaneously, the intake air flowing though the passage 3b drives the turbine 52 to rotate. The generator 54 is driven, based on this rotational motion. In this way, in the medium region of the ACC of the pedal 9 (i.e., the flow volume of intake air is in the moderate region), the turbines 51 and 52 are driven to rotate by the flowing energy of the intake air. The rotational energy is converted into electric energy by means of the generators 53 and 54. The converted electric energy charges the battery 12, in order to recover the flowing energy of the intake air. The case when the driver requests a rapid or large acceleration will now be described.

In the region which the ACC of the pedal 9 is large (i.e., the ACC is larger than the predetermined value ($\gamma$), as shown in FIG. 12), the primary valve 55 is completely opened, and the secondary valve 57 is also opened. Under this condition, a large amount of intake air is preferentially flows through the by-pass 56 in response to the secondary valve 57 being opened. The large amount of intake air is directly and rapidly introduced into the combustion chambers of the engine 1 from the surge tank 21. Further, in the region which the ACC of the pedal 9 is large, the acceleration of the engine 1 is preferably selected over the generation of electric energy utilizing the flowing energy of the intake air, in order to supply the required air to the engine 1.

Clearly described above, according to the air-intake control system of this embodiment, the VCV 58 is closed in the region which the flow volume of intake air flowing through the passage 3 is small. The intake air flows only through the main passage 3a. Therefore, only one turbine 51 is driven to rotate by a little amount of intake air. This rotational motion drives the generator 6 to recover the flowing energy of the intake air. In the region which the flow volume of intake air is small, the flowing energy of a little amount of intake air is utilized to drive the turbine 51 to rotate for generating the electric energy.

In the region which the volume of intake air flowing through the passage 3 is moderate, the intake air flows through both passages 3a and 3b due to the VCV 58 being opened. The turbines 51 and 52 are driven to rotate by the moderate amount of intake air. This rotational motion drives the generators 53 and 54 to rotate, in order to convert the flowing energy of the intake air into the electric energy, so as to recover it. In other words, in the moderate flow volume of intake air, both turbines 53 and 54 are driven to rotate for generating the electric energy, by utilizing the flowing energy of the moderate amount of intake air.

In this way, according to this embodiment, in addition to the operation and effectiveness of the first embodiment, the following operation and effectiveness can be achieved. The number of the turbines 51 and 52 as the air-intake resistance, which will be driven to rotate, in relation to the volume of flowing intake air at that time, is controlled. Therefore, in the region which the flowing volume of intake air is small, only one turbine 51 will be driven to rotate, in relation to the magnitude of the flowing energy of the intake air. Therefore, the generation of the electric energy in response to the flow volume of intake air can be promptly achieved.

Figure 13:
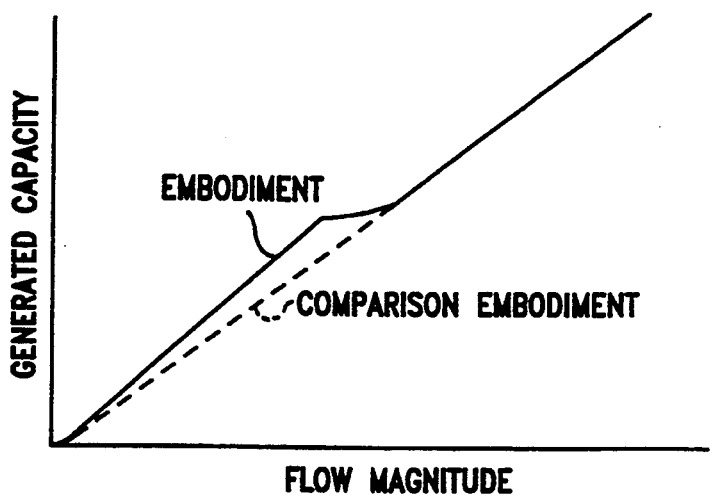
FIG. 13 is a characteristic graph of the correlation between the flow volume of intake air and generated energy.

FIG. 13 shows a characteristic graph illustrating the characteristic of the effectiveness described above. In other words, FIG. 13 shows a characteristic graph illustrating the correlation between the amount of generated electric energy and the flow volume of intake air, comparing this embodiment against the case which only one turbine is provided. This graph indicates that the amount of generated electric energy is increased in the region of the low flow volume of intake air. Therefore, the recovery rate of the flowing energy of the intake air can be improved by the increased amount of generated electric energy.

According to this embodiment, each one of the turbines 51 and 52 is downsized. Therefore, the rotational resistance of individual mass of inertia is reduced. Therefore, each one of the turbines 51 and 52 is driven to rotate by the flowing intake air, each of which becomes relatively small air-intake resistance. Even when the rapid acceleration is requested against the engine 1 by means of deeply thrusting the pedal 9, each one of the turbines 51 and 52 hardly becomes the load to the engine 1. As a result, the acceleration ability can be improved.

Furthermore, according to this embodiment, when the request for rapid acceleration is large, almost all of intake air is directly supplied into the combustion chambers of the engine 1, through the by-pass 56. Consequently, the rapid acceleration can be achieved in response to the large request of the acceleration.

Further, according to this embodiment, the turbine 51 having a light rotational resistance is properly rotated, by the intake air requested during the acceleration period. Even if the opening magnitude of the secondary valve 57 becomes small, adequate acceleration can be achieved. Therefore, the region of the volume of intake air flowing through the by-pass 56 can be narrowed as much as possible. Simultaneously, the region of the volume of intake air for driving the turbines 51 and 52 cab be widened by the above narrowed value. As a result, the turbines 51 and 52 convert the flowing energy of the intake air into the rotational energy, in order to recover it as much as possible. Therefore, the energy recovery efficiency can be further improved.

Sixth Embodiment

The sixth embodiment of an air-intake control system according to the present invention will now be described, referring to FIG. 15. The basic concept of the air-intake control device 10 according to the sixth embodiment is significantly similar to that of the first embodiment.

Figure 15:
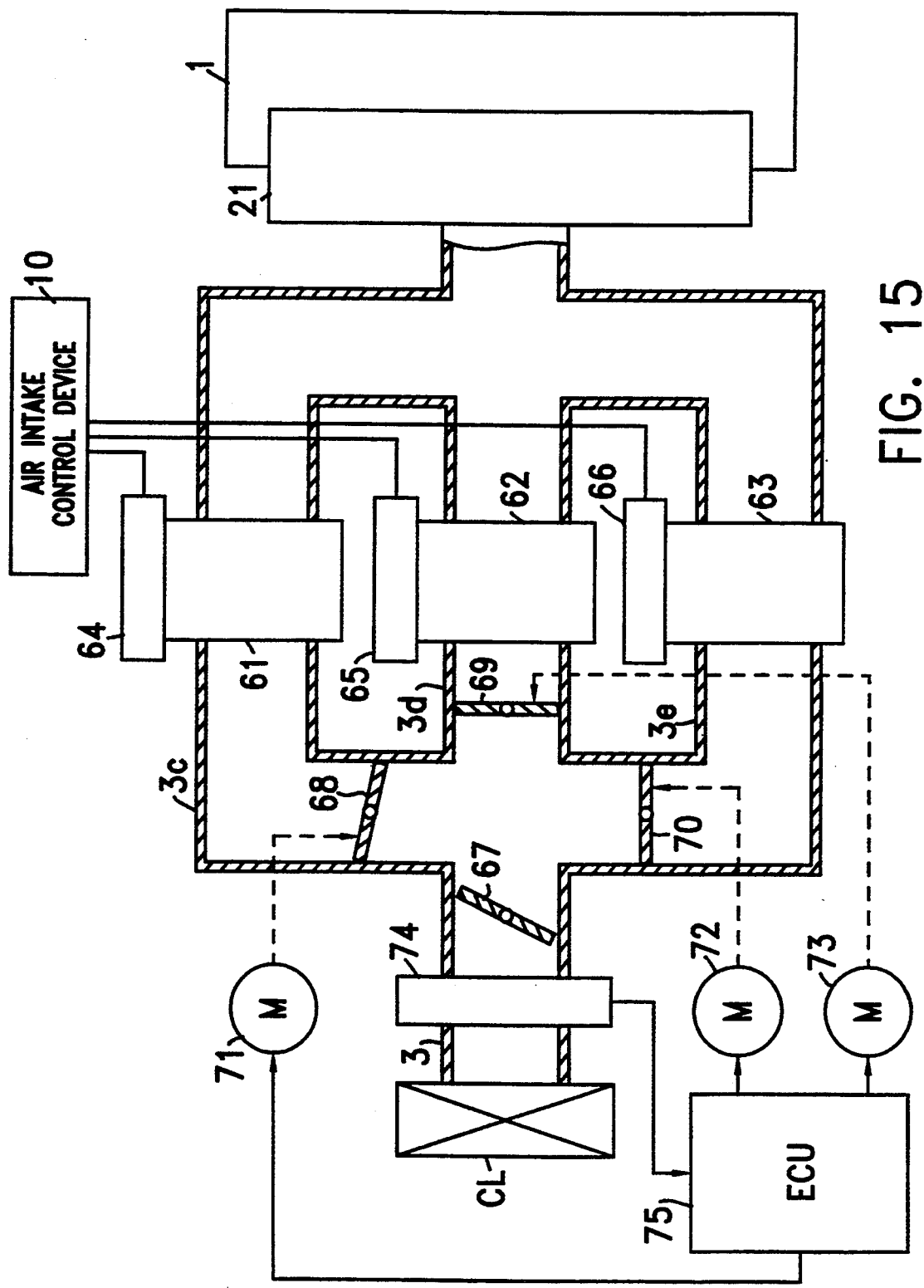
FIG. 15 is a schematic view illustrating an air-intake control system of the sixth embodiment, including an air-intake control device and the ECU for a vehicular engine.

As shown in FIG. 15, the air-intake passage 3 is divided into three passages, namely a first air-intake passage 3c, a second air-intake passage 3d and a third air-intake passage 3e, at the upper stream side from the surge tank 21 of the engine 1. Minimized turbines 61, 62, 63 are disposed midway along the first, second and third passages 3c, 3d, 3e respectively. These passages 3c, 3d, 3e are in parallel with respect to the passage 3. Each one of generators 64, 65, 66 is coaxially provided on the output shaft of the respective generators 64, 65, 66. Each one of the generators 64, 65, 66 is connected to the air-intake control device 10. Each one of the generators 64, 65, 66 converts the rotational energy generated by each one of the turbines 61, 62, 63 into the electric energy. The converted electric energy charges the battery 12 (referring to FIG. 1), via the air-intake control device 10.

A throttle valve 67 is provided midway along the passage 3 at the upper stream side from the each one of the passages 3c, 3d, 3e. An opening magnitude of the valve 67 is controlled in relation to the operation magnitude of the pedal 9.

Further, a first, a second and third control valves 68, 69, 70 are provided midway along the passages 3c, 3d, 3e at the upper stream from the turbines 61, 62, 63 respectively. An opening magnitude of each valve 68, 69, 70 is controlled by driving a first, second, third stepping motors 71, 72, 73, respectively.

An air flowmeter 74 is provided midway along the passage 3 at the upper stream from the throttle valve 67. The air flowmeter 74 detects the flow volume of intake air flowing through the passage 3. An ECU 75 is provided in this system according to this embodiment, for controlling the opening amount of the each one of the first, second and third control valves 68, 69, 70. The ECU 75 loads or reads the detected result of the flow volume of intake air, from the air flowmeter 74. The ECU 75 sequentially drives the first, second and third stepping motor 71, 72, 73 for opening one, two or three of the first, second and third control valves 68, 69, 70, in relation to the corresponding flow volume of intake air, based on the detected result of the flow volume of intake air.

When the flow volume of intake air is small, the ECU 75 drives only the first stepping motor 71 for opening the first control valve 68. Further, when the volume of intake air is moderate, the ECU 75 drives the first and second stepping motors 71 and 72 for opening the first and second control valves 68 and 69. Furthermore, when the volume of intake air is large, the ECU 75 drives all three stepping motors 71, 72, 73 for opening all three control valves 68, 69, 70.

The characteristic operation of the air-intake system according to this embodiment will now be described.

When the opening magnitude of the throttle valve 67 becomes small in response to manipulation of the acceleration pedal 9, the volume of the intake air flowing through the passage 3 decreases. At this time, as the detected result of flow volume of intake air by the air flowmeter 74 is small, the ECU 75 drives only the first stepping motor 71, based on the detected result. Only the first control valve 68 is opened by this drive. This small volume of intake air flows only through the first air-intake passage 3c, and is introduced into the combustion chambers 2 of the engine 1, via the turbine 61 and the surge tank 21. Therefore, when the flow volume of intake air is small, the turbine 61 is solely driven to rotate. The rotational energy generated by the turbine 61 is converted into the electric energy only by the generator 64. Then, the converted electric energy charges the battery 12, via the air-intake control device 10, in order to recover it.

When the opening magnitude of the valve 67 becomes moderate in response to the manipulation of the pedal 9, the volume of intake air flowing through the passage 3 becomes moderate. At this time, the air flowmeter 74 determines that the volume of intake air is moderate. Therefore, the ECU 75 drives the first and second stepping motors 68 and 69, for opening the each one of the first and second valves 68 and 69, respectively, based on the detected result. The moderate volume of intake air flows through both first and second passages 3c and 3d, and is introduced into the combustion chambers 2 of the engine 1, via each one of the turbines 61 and 62, and surge tank 21, respectively. Therefore, when the flow volume of intake air is moderate, the turbines 61, 62 are driven to rotate. The rotational energy generated by the turbines 61, 62 is converted into the electric energy by the generators 64, 65, respectively. The converted electric energy charges the battery 12, via the air-intake control device 10, in order to recover it.

Furthermore, when the opening magnitude of the valve 67 becomes large, in response to the manipulation of the pedal 9, the volume of intake air flowing through the passage 3 becomes large. At this time, the air flowmeter 74 determines that the flow volume of intake air is large. Therefore, the ECU 75 drives all three stepping motors 71, 72, 73 for opening the each one of the valves 68, 69, 70, respectively, based on the detected result. The large volume of intake air flows through all three passages 3c, 3d, 3e, and is introduced into the chambers 2 of the engine 1, via each one of the turbines 61, 62, 63 and the surge tank 21. Therefore, when the volume of intake air is large, all three turbines 61, 62, 63 are driven to rotate. The rotational energy generated by the turbines 61, 62, 63 is converted into the electric energy by the generators 64, 65, 66, respectively. The converted electric energy charges the battery 12, via the air-intake control device 10.

In this way, according to this embodiment, in addition to the operation and effectiveness of the first embodiment, the following operation and effectiveness can be achieved.

According to this embodiment, the passage 3 is divided into three passages, namely the first, second and third air-intake passages 3c, 3d, 3e. As the flow volume of intake air increases, the number of the driven turbines 61, 62, 63 is accordingly increased. Therefore, the region of the volume of intake air flowing through the by-pass 56 can be widely set, in order to efficiently convert the flowing energy of the intake air into the electric energy, similar to the fifth embodiment.

Seventh Embodiment

The seventh embodiment of an air-intake control system according to the present invention will now be described, referring to FIG. 16. The basic concept of the air-intake control device 10 according to the seventh embodiment is significantly similar to that of the first embodiment.

Figure 16:
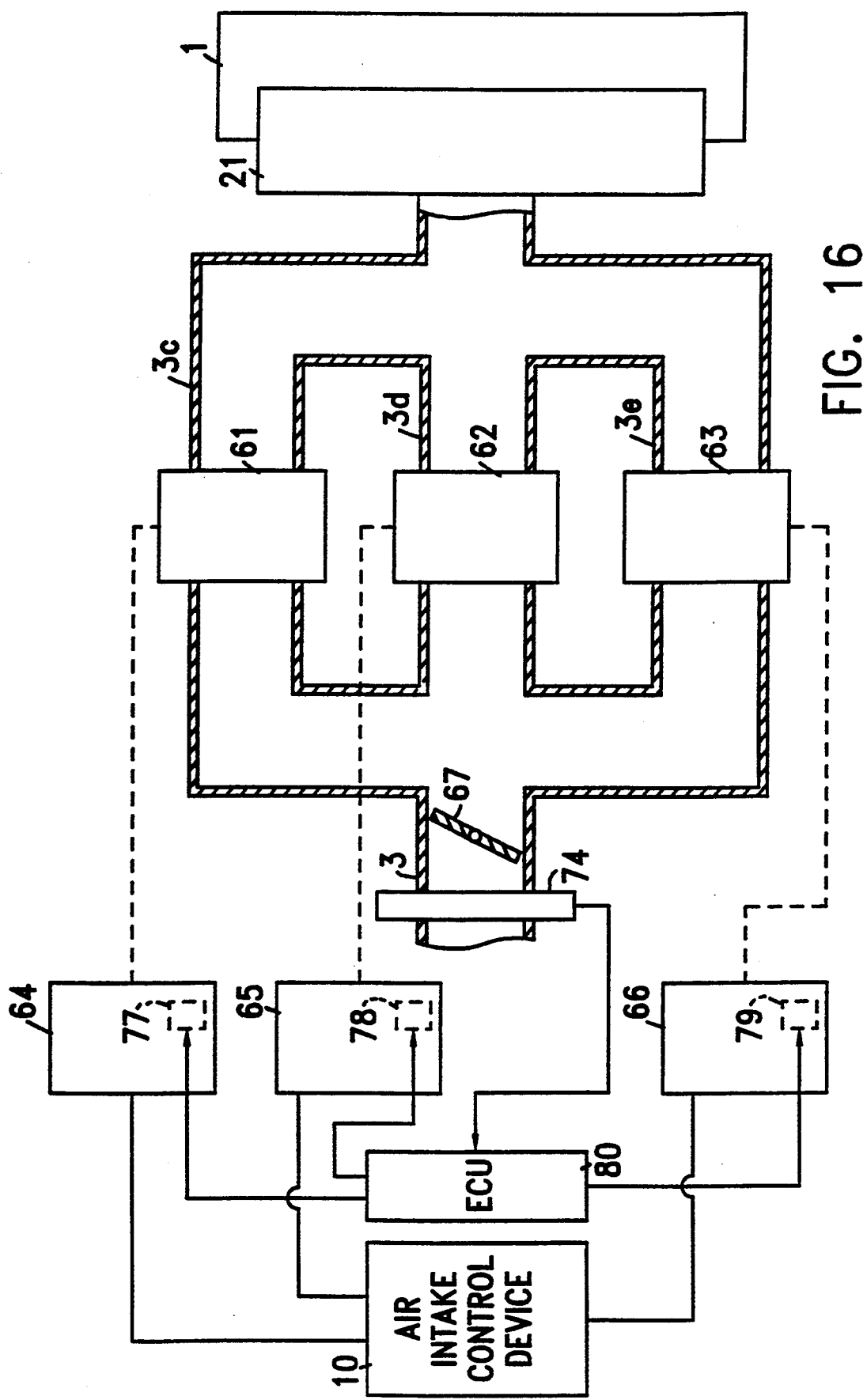
FIG. 16 is a schematic view illustrating an air-intake control system of the seventh embodiment, including an air-intake control device and the ECU for a vehicular engine.
Figure 17:
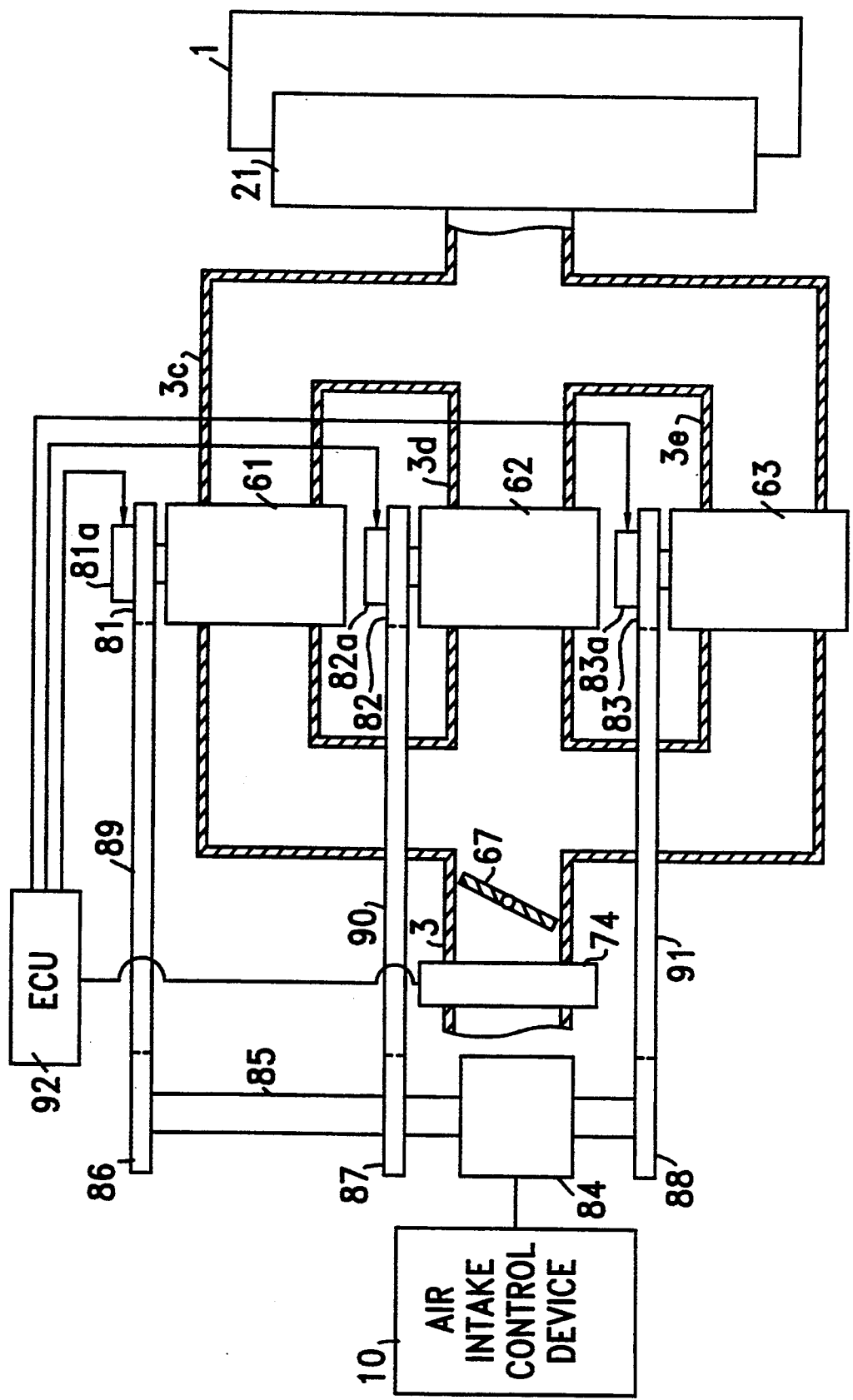
FIG. 17 is a schematic view illustrating an air-intake control system of the eighth embodiment, including an air-intake control device and the ECU for a vehicular engine.
Figure 18:
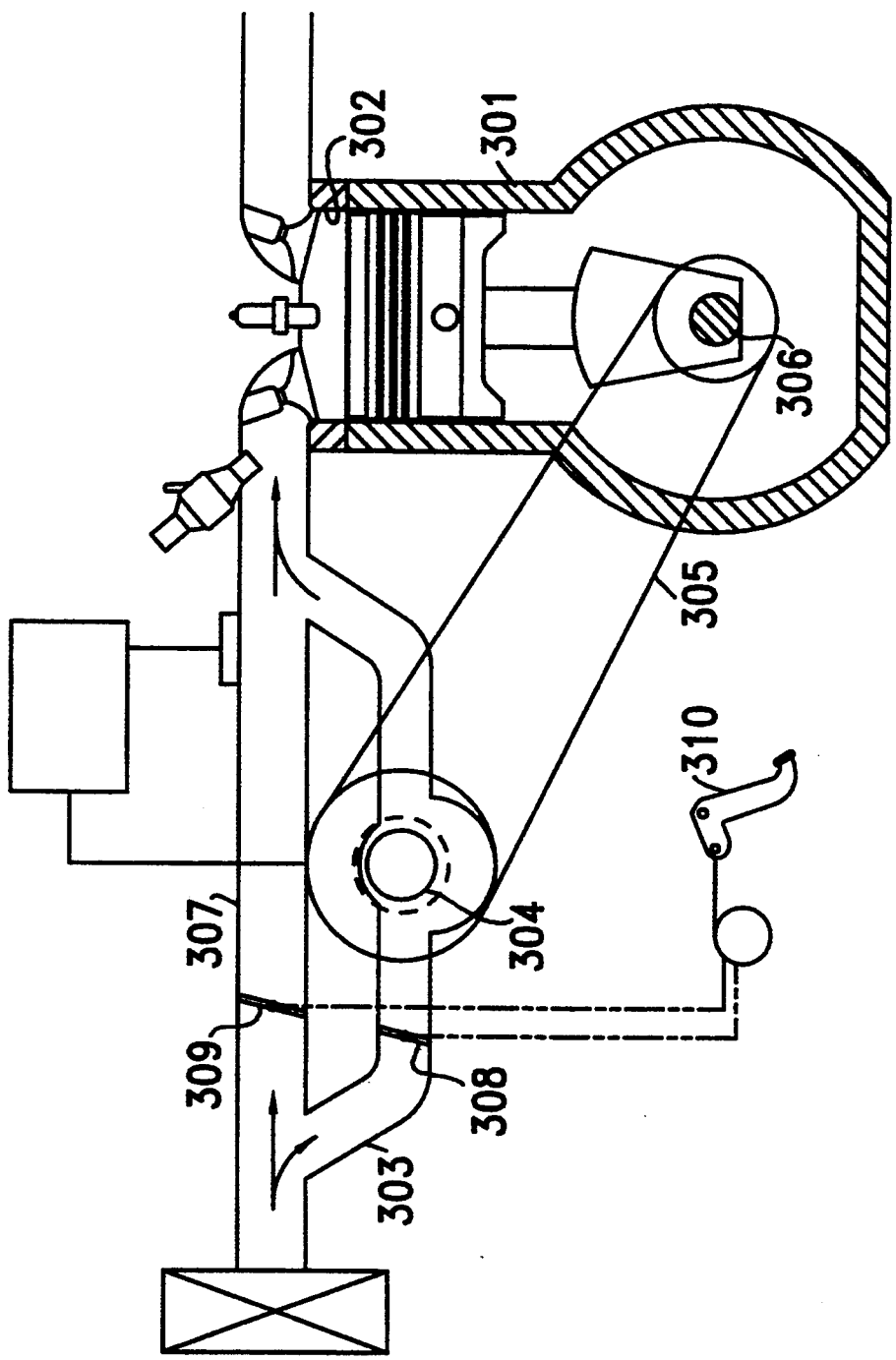
FIG. 18 is a schematic view illustrating a conventional air-intake control system for a vehicular engine.

As shown in FIG. 16, generators 64, 65, 66 are provided on the output shafts of the turbines 61, 62, 63, respectively. A first, second, and third switches 77, 78, 79 are provided within the generators 64, 65, 66, respectively.

According to this embodiment, each one of the generators 64, 65, 66 is connected to the air-intake control device 10. An ECU 80 is provided for controlling the generation of electric energy by each one of the generators 64, 65, 66. The ECU 80 loads or reads the detected result of the flow volume of intake air from the air flowmeter 74. The ECU 80 sequentially turns on the switches 77, 78, 79, in order to generate the electric energy by the generators 64, 65, 66, in response to the flow volume of intake air, based on the detected result of the flow volume of intake air. When the volume of intake air is small, the ECU 80 activates only the first switch 77, for activating only the generator 64. Further, when the volume of intake air is moderate, the ECU 80 turns on the first and second switches 77, 78 for permitting the generators 64, 65 to generate the electric energy. Furthermore, when the volume of intake air is large, the ECU 80 turns on all three switches 77, 78, 79 for activating all three generators 64, 65, 66.

The characteristic operation of the air-intake system according to this embodiment will now be described.

When the opening magnitude of the throttle valve 67 becomes small in response to the manipulation of the acceleration pedal 9, the volume of intake air flowing through the passage 3 is also small. At this time, as the detected result of small volume of intake air, the ECU 80 turns on only the first switch 77, based on the detected result. The "ON" condition of the switch 77 activates the generator 64 to generate the electric energy. Along this condition, only the turbine 61 disposed within the first air-intake passage 3c is driven to rotate for generating the rotational energy. The rotational energy of the turbine 61 is transmitted to the generator 64 for generating the electric energy. As a result, the converted electric energy by the generator 64 is recovered by the battery 12, via the air-intake control device 10.

Further, when the opening magnitude of the valve 67 is moderate, in response to the manipulation of the pedal 9, the volume of intake air in the passage 3 is moderate. Since, the detected result of volume of intake air by the air flowmeter 74 is moderate, the ECU 80 activates the first and second switches 77, 78. Subsequently, the switches 77, 78 enable the generators 64, 65 to generate the electric energy, respectively. On the other hand, the turbines 61, 62 are driven for generating the rotational energy. The rotational energy generated by the turbines 61, 62 is transmitted to the generators 64, 65, resulting in generation of the electric energy. This converted electric energy is recovered by the battery 12, via the air-intake control device 10.

Furthermore, when the valve opening magnitude is large, in response to the manipulation of the pedal 9, the volume of the intake air in the passage 3 is large, too. This is detected by the ECU 80. In response to the detected result, the ECU 80 turns on all three switches 77, 78, 79. Then, the switches 77, 78, 79 activate the generators 64, 65, 66. Along these operations, the turbines 61, 62, 63 are driven to generate the rotational energy. The rotational energy is transmitted to the generators 64, 65, 66, so as to be converted into the electric energy, which is recovered by the battery 12, via the air-intake control device 10.

According to this embodiment, the passage 3 is divided into three passages; the first, second and third air-intake passages 3c, 3d, 3e, likewise the sixth embodiment. As the volume of intake air increases, the number of the driven turbines 61, 62, 63 is accordingly increased. Therefore, the region of the volume of intake air can be widely set, in order to efficiently convert the flowing energy of the intake air into the electric energy.

Eighth Embodiment

The eighth embodiment of an air-intake control system according to the present invention will now be described, referring to FIG. 16. The basic concept of the air-intake control device 10 according to the eighth embodiment is significantly similar to that of the first embodiment.

As shown in FIG. 16, a first, second, and third pulleys with crutch 81, 82, 83 are mounted on the output shafts of the turbines 61, 62, 63, respectively. A generator 84 is disposed remotely from the each one of the turbines 61, 62, 63. The generator 84 is connected to the air-intake control device 10. Pulleys 86, 87, 88 corresponding to the pulleys with crutch 86, 87, 88 are mounted on an input shaft, which is outwardly protruding from the generator 84, respectively. Each one of the pulleys with crutch 81, 82, 83 is operably connected with the corresponding pulleys 86, 87, 88, via respective belts 89, 90, 91, respectively.

According to this embodiment, an ECU 92 is provided for controlling the operative connection between each one of the turbines 61, 62, 63 with the generator 42. The ECU 192 loads or reads the detection result of the volume of intake air from the air flowmeter 74. The ECU 92 sequentially activates the crutches 81, 82, 83 in order to operably connect with the generator 84, in response to the flow volume of intake air. When the volume of intake air is small, the ECU 92 turns on only one crutch 81a for operably connecting the turbine 61 with the generator 84. Further, when the volume of intake air is moderate, the ECU 92 turns on the crutches 81a, 82a for operably connecting the turbines 61, 62 with the generator 84. Furthermore, when the volume of intake air is large, the ECU 92 activates three crutches 81a, 82a, 83a for connecting all three turbines 61, 62, 63 with the generator 84.

The characteristic operation of the air-intake system according to this embodiment will now be described.

In accordance with the small operation magnitude of the acceleration pedal 9, the volume of intake air in the passage 3 becomes small. Therefore, the ECU 92 activates only the crutch 81a of the first pulley. Then, the crutch 81a enables the generator 84 to operably connect with the turbine 61. Along this condition, only the turbine 61 in the first air-intake passage 3c is driven whose rotational energy is transmitted to the generator 84 for generating the electric energy. This electric energy is recovered by the battery 12.

Further, in response to the moderate manipulation amount of the pedal 9, the flow volume of intake air in the passage 3 is slightly increased, causing the ECU 92 to activate the first and the crutches 81a, 82a of the pulleys 81, 82. Therefore, The crutches 81a, 82a enable the turbines 61, 62 to connect with the generator 84. Along these conditions, the turbines 61, 62 in the passages 3c, 3d are driven. The rotational energy of the turbines 61, 62 is transmitted to the generator 84 for generating the electric energy to be recovered by the battery 12.

In response to the large operation magnitude of the pedal 9, the ECU 92 activates all crutches 81a, 82a, 83a. This enables the turbines 61, 62, 63 to operably connect with the generator 84. Parallel with the above conditions, the turbines 61, 62, 63 in the passages 3c, 3d, 3e are rotating. Therefore, the generator 84 generates the electricity.

According to this embodiment, in addition to the operation and effectiveness of the first embodiment, the following operation and effectiveness can be achieved. The passage 3 is divided into three passages, namely the first, second and third air-intake passages 3c, 3d, 3e. As the flow volume of intake air increases, the number of the driven turbines 61, 62, 63 is accordingly increased. Therefore, the region of the flow volume of intake air can be widely set, in order to efficiently convert the flowing energy of the intake air into the electric energy.

Although eight embodiments are described herein, it should be apparent to those skilled in the art that the present invention may be embodied in many other specific forms without departing from the spirit or scope of the invention.

Particularly, it should be understood that following modes are to be applied.

In the first embodiment, the base current (IB) (i.e., controlling current) is varied, by sliding the sliding element 8b of the potentiometer 8 in relation to the operation magnitude of the pedal 9. In place of this control, an acceleration pedal sensor for detecting the operation magnitude of the pedal 9 can be provided, for varying the base current (IB) by a controller (e.g., ECU).

In the first embodiment, the displacement type pump is employed as the air motor including the turbine 5. A non-displacement type pump can be employed, in place of the displacement type pump.

In the second and third embodiments, only the detected result of the opening magnitude of the primary throttle valve 22 detected by throttle sensor 28 is utilized to control the opening magnitude (THS1) of the secondary throttle valve 22. However, the information data from a traction control system (TRC) can be utilized for controlling the secondary throttle valve 26. In other words, when the road surface is wet, the opening magnitude of the secondary valve 11 can be slightly set small. Further, in the engine including an automatic transmission, the opening magnitude of the secondary valve 11 can be slightly set small, in response to the opening magnitude of the secondary throttle valve (THS1).

In the second and third embodiments, the opening magnitude of the secondary throttle valve 26 is controlled, in accordance with the maps in FIGS. 4 and 5. However, the characteristic of the maps can be varied. For example, the map in FIG. 4 can be a straight line. The map in FIG. 5 can be generally a curve.

In the fourth embodiment, the switch 6a is provided within the generator 6, for controlling the electrical connection between the turbine 5 and the generator 6. Instead of this configuration, a crutch can be provided between the generator 6 and the turbine 5. When the coolant temperature (TBW) is less than the predetermined temperature ($\beta$), this crutch mechanically disconnects the turbine 5 from the generator 6. Therefore, the turbine 5 can be freed from the rotation.

In the third and fourth embodiments, the coolant sensor 31 as air-intake temperature detecting means is employed for detecting the coolant temperature (THW) corresponding to the air-intake temperature. An air-intake temperature sensor can be employed, in place of the coolant temperature sensor 31. Therefore, the air-intake temperature can be directly detected by the air-intake temperature sensor.

In the second through fourth embodiments, only one turbine 5 and generator 6 are provided in the air-intake passage 3. Each one of the plurality of the air-intake passages, which are provided in parallel, can have a turbine and generator. Therefore, the number of the operating generators can be varied, in relation to the air-intake temperature, for efficiently recovering the generated energy.

In the fifth embodiment, when the flow volume of intake air exceeds the standard value, the VCV 58 is provided in the secondary air-intake passage 3b, which is opened in response to the negative pressure generated around the port 13. The control valve which is controlled by the stepping motor can be employed, in place of the VCV 58. Furthermore, when the flow volume of intake air exceeds the standard value, the ECU drives the stepping motor to open the this control valve.

In the sixth through eighth embodiments, the by-pass passage 56 and secondary throttle valve 57, which are described in the fifth embodiment, are eliminated. However, these by-pass 56 and the secondary throttle valve 57 can be provided thereto.

Furthermore, each one of the configurations described in the fifth through eighth embodiments can be preferably combined one another.

In the fifth through eighth embodiments, the passage 3 is divided into two or three passages, in which two or three turbines 51, 52 or 61, 62, 63 are provided in parallel, respectively. The passage 3 can be divided into more than four passages. Corresponding numbers of the turbines with respect to the number of the divided passages can be provided within the divided passages, in parallel.

Therefore, the present examples and embodiments are to be considered as illustrative and not restrictive and the invention is not to be limited to the details giving herein, but may be modified within the scope of the appended claims.

What is claimed is:

1. An air-intake control system for an engine, wherein the engine includes means for determining a volume of intake air required by the engine based on a detected engine operating condition, the air-intake control system comprising:
- an air-intake passage;
- flow control means disposed midway along said air-intake passage, said flow control means being rotatably driven by a flow of intake air, wherein the flow control means controls the volume of intake air flowing in the passage downstream of the flow control means by its rotational motion;
- energy generating means for generating electric energy in accordance with the rotation of the flow control means, said energy generating means providing a resistance to the rotation of the flow control means which is proportional to the magnitude of the electric energy generated by the energy generating means;
- an air-intake control device for controlling said energy generating means to increase the magnitude of the energy generated when the volume of intake air required is decreased in accordance with the detected operating condition of the engine.

2. A system according to claim 1, wherein said flow control means includes at least one turbine having an output shaft.

3. A system according to claim 2, wherein said energy generating means includes at least one generator operably connected to the output shaft of the turbine, and generating the electric energy in accordance with the rotational motion of the turbine.

4. A system according to claim 1, further comprising a by-pass passage disposed within said air-intake passage, said by-pass passage connected an upstream side of said flow control means with a down stream side of said flow control means.

5. A system according to claim 4, wherein said air-intake control device includes at least one throttle valve disposed within said air-intake passage, said throttle valve controlling the real volume of intake air flowing into said by-pass passage.

6. A system according to claim 5, further comprising:
- at least one stepping motor for driving said throttle valve;
- an open magnitude sensor for detecting an opening magnitude of the throttle valve requested by an operator of the engine; and
- motor control means for controlling said stepping motor in accordance with data including the requested opening magnitude.

7. A system according to claim 6, wherein said motor control means includes a first electronic control unit for calculating an increment of the requested opening magnitude, and controlling said stepping motor to increase a real opening magnitude of said throttle valve in response to the magnitude raise of increment.

8. A system according to claim 6, further comprising:
- a temperature sensor for detecting the temperature of the intake air flowing into the engine;
- a throttle sensor detecting a real opening magnitude of the throttle wherein said motor control means includes an electronic control unit for controlling the stepping motor to conform the real opening magnitude to the requested opening magnitude when the temperature exceeds a predetermined value, and to increase the real opening magnitude for increasing the flow volume of the intake air flowing into said by-pass passage, when the temperature is less than the predetermined value.

9. A system according to claim 5, wherein said air-intake control device includes:
- at least one switching member for controlling the connection between said flow control means and said generator;
- a temperature sensor for detecting the temperature of intake air flowing into said engine; and
- an electronic control unit for controlling the switching member to connect the flow control means and the generator when the detected temperature exceeds a predetermined value and to disconnect the flow control means and the generator when the detected temperature is less than the predetermined value.

10. A system according to claim 2, wherein said turbine substantially forms an air motor.

11. An air-intake control system for an engine, wherein the engine includes means for determining a volume of intake air required by the engine based on a detected engine operating condition, the air-intake control system comprising:
- an air-intake passage;
- a plurality of branch passages formed in said air-intake passage, each branch passage extending from an upstream end to a downstream end;
- at least one turbine disposed midway along one of said branch passages, said turbine being rotated by the intake air flow, wherein the turbine controls the volume of intake air flowing in the branch passage downstream of the turbine by its rotational motion, said turbine having an output shaft;
- a generator connected to the output shaft of the turbine for generating electric energy in accordance with the rotational motion of the turbine, said generator controlling the rotation of said turbine in accordance with the magnitude of the electric energy generated;
- an air-intake control device for controlling said generator to increase the magnitude of the electric energy generated when the volume of intake air required by the engine is decreased in accordance with the detected operational condition of the engine; and
- control means for controlling the turbine and the flow of air through the branch passages to vary the number of turbines being driven and, consequently, to vary the number of generators rotated based on the volume of air required by the engine.

12. A system according to claim 11, wherein said turbine substantially forms an air motor.

13. A system according to claim 11, further comprising:
- at least one throttle valve disposed within said air-intiake passage upstream of the upstream ends of the branch passages.

14. A system according to claim 13, further comprising:
- a vacuum control valve disposed in one of the branch passages;
- a negative pressure port disposed in the vicinity of the throttle valve; and
- a negative pressure passage communicating said vacuum control valve with said negative pressure port.

15. A system according to claim 13, wherein said control means includes an air flowmeter for detecting the real volume of intake air flowing in the air-intake passage.

16. A system according to claim 15, further comprising:
- a valve disposed within one of said branch passages;
- a motor for actuating said valve; and
- an electronic control unit for controlling the motor to control the flow of air through the respective branch passage to prevent rotation of a turbine located in the branch passage when the volume of air required by the engine is decreased.

17. A system according to claim 15, wherein said control means includes:
- switching means for connecting said turbine to said generator and for disconnecting said turbine from said generator; and
- connection means for controlling said switching means to disconnect the turbine from the generator to decrease a resistance provided to the flow of intake air by the turbine when the volume of intake air required by the engine is increased and to connect the tubine to the generator to increase the resistance to the flow of intake air when the volume of intake air required by the engine is decreased.

18. A system according to claim 17, wherein:
said switching means includes a switch for connecting said turbine to said generator and for disconnecting the turbine from the generator; and
wherein said connection control means includes an electronic control unit for disconnecting the turbines from the generator to decrease the resistance provided to the flow of intake air by the turbine when the volume of intake air required by the engine is increased and to connect the tubine to the generator to increase the resistance provide to the flow of intake air when the volume of intake air required by the engine is decreased.

19. A system according to claim 17,
wherein said switching means includes a clutch for selctively connecting the turbine and the generator.

20. An air-intake control system for an engine, wherein the engine includes means for determining a volume of intake air required by the engine based on a detected engine operating condition, the air-intake control system comprising:
- an air-intake passage;
- at least one turbine disposed midway along said air-intake passage, said turbine being rotated by the intake air flow, wherein the turbine controls the volume of intake air flowing in the air-intake passage downstream of the turbine by its rotational motion, wherein said turbine has an output shaft;
- a generator connected to the output shaft of the turbine for generating electric energy in accordance with the rotational motion of the turbine, said generator controlling the rotation of said turbine in accordance with the magnitude of the electric energy generated;
- an air-intake control device for controlling said generator to increase the magnitude of the electric energy generated when the volume of intake air required by the engine is decreased in accordance with the detected operational condition of the engine; and
- control means for controlling the turbine and the flow of air through the air-intake passage to vary the number of turbines being driven and, consequently, to vary the number of generators rotated based on the volume of air required by the engine.

* * * * *

UNITED STATES PATENT AND TRADEMARK OFFICE
CERTIFICATE OF CORRECTION

PATENT NO. : 5,394,848  
DATED : March 7, 1995  
INVENTOR(S) : Yashuhito Tsutsumi et al.

It is certified that error appears in the above-indentified patent and that said Letters Patent is hereby corrected as shown below:

| Column | Line | |
|---|---|---|
| 5 | 43 | Delete "the". |
| 6 | 16 | Change "Likewise" to --As in--. |
| 6 | 23 | Before "other" delete "the". |
| 6 | 53 | Before "those" delete "the". |
| 8 | 11 | Change "degree of depression" to --opening magnitude--. |
| 8 | 12 | Change "raise" to --increase--. |
| 8 | 15 | Change "operation magnitude" to --degree of depression--. |
| 8 | 44 | Delete "cleaned". |
| 8 | 45 | After "intake air" insert --cleaned--. |

UNITED STATES PATENT AND TRADEMARK OFFICE
CERTIFICATE OF CORRECTION

PATENT NO. : 5,394,848　　　　　　　　　　Page 2 of 4
DATED : March 7, 1995
INVENTOR(S) : Yashuhito Tsutsumi et al.

It is certified that error appears in the above-indentified patent and that said Letters Patent is hereby corrected as shown below:

| Column | Line | |
|---|---|---|
| 8 | 66 | Change "cleaned air" to --air cleaned--. |
| 9 | 47 | Change "follow;" to --follows:--. |
| 9 | 52 | Change "boost." to --increase.--. |
| 10 | 45 | After "manipulated" insert --as to--. |
| 10 | 68 | Change "misty" to --vapor--. |
| 13 | 7 | After "region" insert --in--. |
| 13 | 16 | After "flowing" insert --in--. |
| 13 | 24 | After "region" insert --in--. |
| 13 | 42 | After "flows" insert --through--. |

UNITED STATES PATENT AND TRADEMARK OFFICE
CERTIFICATE OF CORRECTION

PATENT NO. : 5,394,848

DATED : March 7, 1995

INVENTOR(S) : Yashuhito Tsutsumi et al.

Page 3 of 4

It is certified that error appears in the above-indentified patent and that said Letters Patent is hereby corrected as shown below:

| Column | Line | |
|---|---|---|
| 13 | 60 | After "region" insert --in--. |
| 13 | 65 | After "air" delete "is". |
| 14 | 1 | After "region" insert --in--. |
| 14 | 9 | After "region" insert --in--. |
| 14 | 15 | After "region" insert --in--. |
| 14 | 19 | After "region" insert --in--. |
| 14 | 37 | After "region" insert --in--. |
| 14 | 48 | After "case" insert --in--. |
| 14 | 63 | Change "hardly" to --only slightly--. |
| 18 | 16 | Change "Along" to --As a result of--. |
| 19 | 6 | Change "Along" to --As a result of--. |
| 19 | 17 | Change "Along" to --As a result of--. |

UNITED STATES PATENT AND TRADEMARK OFFICE
CERTIFICATE OF CORRECTION

PATENT NO. : 5,394,848
DATED : March 7, 1995
INVENTOR(S) : Yashuhito Tsutsumi et al.

It is certified that error appears in the above-indentified patent and that said Letters Patent is hereby corrected as shown below:

| Column | Line | |
|---|---|---|
| 19 | 22 | Change "operation magnitude" to --degree of depression--. |
| 19 | 25 | Change "Parallel" to --Simultaneously--. |
| 20 | 15 | Change "(TBW)" to --(THW)--. |
| 20 | 43 | After "open" delete "the". |
| 20 | 47 | Change "these by-pass" to --the by-pass passage--. |
| 21 | 55 | Change "magnitude raise of increment" to --increment of the requested magnitude--. |
| 23 | 21 | Change "tubine" to --turbine--. |
| 23 | 35 | Change "tubine" to --turbine--. |
| 23 | 36 | Change "provide" to --provided--. |

Signed and Sealed this

Twenty-fourth Day of October, 1995

Attest:

BRUCE LEHMAN

Attesting Officer

Commissioner of Patents and Trademarks